(12) United States Patent
Jang

(10) Patent No.: US 12,293,412 B1
(45) Date of Patent: May 6, 2025

(54) GENERATION OF TIME-INTERVAL-SPECIFIC SUPPORT VECTOR MACHINE

(71) Applicant: Chicago Mercantile Exchange Inc., Chicago, IL (US)

(72) Inventor: Jayden Seowook Jang, New York, NY (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 220 days.

(21) Appl. No.: 17/846,811

(22) Filed: Jun. 22, 2022

(51) Int. Cl.
 *G06Q 40/04* (2012.01)
 *G06F 18/2411* (2023.01)

(52) U.S. Cl.
 CPC ......... *G06Q 40/04* (2013.01); *G06F 18/2411* (2023.01)

(58) Field of Classification Search
 USPC .......................................................... 705/37
 See application file for complete search history.

(56) References Cited

U.S. PATENT DOCUMENTS

| | | | |
|---|---|---|---|
| 9,929,743 B1 * | 3/2018 | Acuña-Rohter | H03M 7/30 |
| 10,565,651 B2 * | 2/2020 | Bonig | G06Q 40/04 |
| 10,719,874 B2 * | 7/2020 | Bauerschmidt | G06Q 40/06 |
| 11,010,439 B2 * | 5/2021 | Zonabend | G06F 16/9535 |
| 11,023,969 B2 | 6/2021 | Singh et al. | |
| 2015/0127515 A1 * | 5/2015 | Studnitzer | G06Q 40/04 |
| 2016/0247065 A1 * | 8/2016 | Nasle | G06N 5/02 |
| 2016/0314532 A1 | 10/2016 | Yin et al. | |
| 2018/0191624 A1 * | 7/2018 | Haynold | H04L 47/33 |
| 2018/0262207 A1 * | 9/2018 | Acuña-Rohter | G06Q 40/04 |
| 2018/0268482 A1 * | 9/2018 | Bonig | G06Q 40/06 |
| 2019/0244288 A1 * | 8/2019 | Singh | G06Q 40/04 |

FOREIGN PATENT DOCUMENTS

| | | | | |
|---|---|---|---|---|
| EP | 3522098 A1 * | 8/2019 | | G06N 20/00 |
| WO | WO-03021379 A2 * | 3/2003 | | G06Q 30/06 |

OTHER PUBLICATIONS

Title: Optimal Trade Execution: an Evolutionary Approach Authors: Marcus Lim, Richard J. Coggins Publisher: IEEE (Year: 2005).*
Rushikesh Pupale, "Support Vector Machines(SVM)—an Overview", Towards Data Science, Jun. 16, 2018, 13 pages.

* cited by examiner

*Primary Examiner* — Gregory S Cunningham, II
*Assistant Examiner* — Yongsik Park
(74) *Attorney, Agent, or Firm* — Lempia Summerfield Katz LLC

(57) ABSTRACT

A system may receive request electronic data messages and counter-request electronic data messages from various network participant nodes within a defined time interval. The system may extract data from the electronic data messages to generate input codes including indicators that characterize execution values and imputed variability levels for the electronic data messages and/or characterize the message types of the electronic data messages. The input codes are used to generate a time-interval-specific support vector machine for the defined time interval. The system may then generate dummy data including execution value and imputed variability level tuples. The dummy data is used to map boundary levels from the time-interval-specific support vector machine versus execution values.

20 Claims, 7 Drawing Sheets

GENERATION OF TIME-INTERVAL-SPECIFIC SUPPORT VECTOR MACHINE

BACKGROUND

Current financial instrument trading systems allow traders to submit orders and receive confirmations, market data, and other information electronically via a communications network. Electronic trading of financial instruments, such as futures contracts, is conducted by market participants sending orders, such as to buy or sell one or more futures contracts, in electronic form to the Exchange. These electronically submitted orders to buy and sell are then matched, if possible, by the Exchange, i.e., by the Exchange's matching engine, to execute a trade. Outstanding (unmatched, wholly unsatisfied/unfilled or partially satisfied/filled) orders are maintained in one or more data structures or databases referred to as "order books," such orders being referred to as "resting." and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing to buy or sell that product, as well as the desired quantities therefore. The collection of quantities available to buy or sell at different prices may be reflective of the product's liquidity, i.e., the case with which a willing seller may find a willing buyer and vice versa.

In various contexts, information characterizing various states of the market may be in demand from participants. However, computing load, computational complexity, and/or other factors may prevent computing systems from being able to provide such characterizations in a time frame in which the computational results would still be valid and/or useful. Accordingly, improvements to computational capacity and flexibility will continue to drive demand for computing systems that characterize market states.

DETAILED DESCRIPTION

Figure 1:
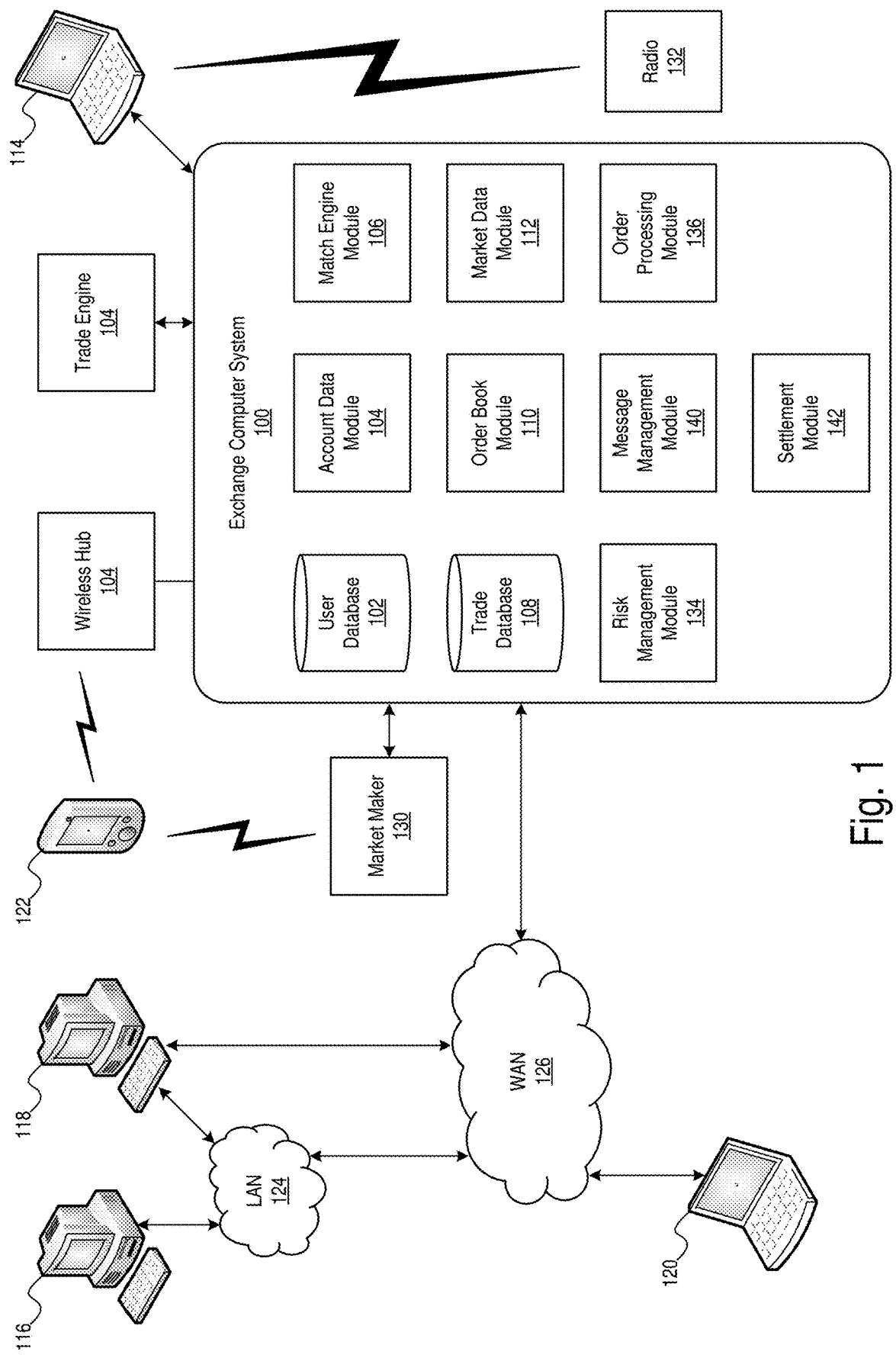
FIG. 1 shows an illustrative computer network system for use with various implementations.

In various contexts, a measure of the variability level of a system may be computed to determine the likelihood of the system reaching a particular state from a current state. Thus, when an operation is executed on the assumption that the system will reach a particular state, the execution of that operation imputes at least a corresponding variability level on the system. For example, systems predicting an optimized mass of salt to spread on a road prevent ice growth may implement a measure of imputed variability in temperature. The finalized mass of salt selected by the optimized salt distribution system will be associated with a particular imputed variability in temperature (e.g., an implication that the temperature will shift less than a given imputed variability or that temperature will shift more than a given imputed variability).

In another example context, an imputed variability may be associated with transactions in a financial products market. For example, a bid or ask price for an options contract at a particular strike price may impute a particular variability on the expected future prices of the underlying products. In some cases in financial markets, this may be also referred to as implied volatility. In such cases, the bid or ask price imputes a variability in market for the current trading price to shift relative to the option contract's strike price such that the bid or ask price shifts from an "out of the money" state to an "in the money" state, e.g., that the return at the strike price exceeds the bid or ask price. Existing systems may, for example, calculate an imputed variability associated with a particular bid or ask price and current market conditions based on various models, e.g., implied volatility models.

In the example context, an options contract may include a contract to buy and/or sell a quantity of an underlying financial product, an underlying good, or other underlying product/transaction at a strike price. A bid offer may include an offer to buy an options contract. An ask offer may include an offer to sell an options contract. A return from an options contract may include the gain or loss achieved by executing the options contract at the strike price relative to the current trading price of the underlier. In some cases, at a bid or ask price, an offer for an options contract may be "out of the money", which may refer to state where that if executed at the strike price, return from the offer would not exceed the price of the bid offer. In some cases, at a bid or ask price, an offer for an options contract may be "in the money", which may refer to state where that if executed at the strike price, return from the offer would exceed the price of the bid offer, an offer for an options contract may be "at the money", which may refer to state where that if executed at the strike price, return from the offer would be equal to the price of the bid offer.

The options contract may include a put, e.g., an option to sell a specified quantity of the underlier a specified time in the future; a call e.g., an option to buy a specified quantity of the underlier a specified time in the future; or other optional transaction right regarding the underlier (which may include future rights and/or other transactional rights). The underlier may include a good, a financial product (including derivative financial products), an ownership right (such as a stock), a service, a non-tangible product, a contract option rights for a second underlier, and/or a combination of underliers.

In the example context, requests (e.g., bids, asks, or other transaction requests) are matched to counter-requests (e.g., counterpart asks to bids, counterpart bids to ask, and/or other counterpart transactions). Matching occurs when a request and counter request have overlap in price and quantity (e.g., size of options contract). In some cases, overlap may only be partial. For example, a bid acquires some but not all of a quantity offered via an ask, or vice versa. For example, a bid price exceeds an ask price. Examples of matching are discussed in detail below. A trade may be executed when a match occurs, as discussed in more detail below.

In an example context, request electronic data messages may request a particular operation at a particular request value. For example, operations may include assigning a request value to the acquisition of execution tokens for the prioritization of smart contract computer code execution. Counter-request electronic data messages may include electronic data messages that may be paired as counterparts to the request electronic data messages for completion of the operations at a counter-request value. A pairing may result when the request and counter-request values match. Such request electronic data messages and counter-request electronic data messages may be used in various other contexts, including any of the contexts discussed herein.

In various systems, a particular imputed variability may be computed for a given request (or counter-request) value that is assigned by a particular electronic data message. The particular electronic data message may specify a particular execution value (e.g., a value at which an underlying operation may occur). Additionally, the current operating conditions may dictate the level of change needed to meet the conditions specified by the particular electronic data message. Although calculation of imputed variability for a single electronic data message may be computationally practicable for current systems, current systems rely on expert human input and/or ad hoc statistical analysis to synthetize consensus state data and/or predictive data from multiple request and counter-request electronic data messages.

Because individual statistical regression analyses have varying accuracy depending on the configuration of the data from the electronic data messages, current systems select an appropriate regression ad hoc to synthetize the consensus state data representative of the group of electronic data messages. Because the selection of regression is not determined a priori, the system may lack transparency in some cases. Although individual regression types may be inappropriate for various data configurations, multiple different regression types may still be appropriate for any one data configuration. Accordingly, systems using ad hoc statistical analysis may not necessarily represent a consensus statistical approach. Because different systems may select different appropriate regression types for the same set of data, disagreement on the correct regression to select in a given circumstance may exist.

When regard to human experts, the same challenges apply to the extent the human experts rely on ad hoc statistical regression. With regard to human experts relying on experience and intuition to draw or otherwise produce synthesis data, the challenges because more pronounced because some level of disagreement among experts is inevitable. Further experience and intuition without rigorous justification, while useful, offer little transparency. Further, synthesis of such consensus state data by a single human expert is slow (such analysis can take 30 minutes or more). For systems, where applicability of such consensus state data is short lived (e.g., five minutes or less), human input may be insufficient to support live provision of consensus state reporting. Achieving consensus among a group of human experts is even slower, up to doubling (or more) the time used by a single expert to allow for review, discussion, and explanation of results.

In some cases, one or more data gaps (e.g., regions in a plot of data points where data points may be absent and/or otherwise scarce). Generation of synthesis data covering such data gap regions may further highlight issues of transparency and/or consensus. Because of uncertainty, which may include inherent mathematical uncertainty, generation of the consensus state data for data gap regions may relatively more reliant on human intuition and/or experience. Therefore, the reasoning behind its generation may be less transparent than that of non-gap regions. Further, such data gap regions are also relatively more likely to cause disagreement among experts regarding their proper handling and divergence among the resultant consensus data from varying statistical analyses. Moreover, such regions may lead to additional delays in generation of consensus data by human experts. The techniques and architectures of the embodiments discussed herein solve at least these technical problems by providing transparent results (e.g., via support vector machine generation), high-speed consensus results (e.g., via trained artificial neural networks), and/or machine-learning techniques to provide complete imputed variability level data in data gap regions. In other words, the techniques and architectures of the embodiments discussed herein provide trust increasing results and fill in gaps in the data via technical solutions not present in existing systems.

In some various scenarios, participants (e.g., network participants, market participants, peer-to-peer participants, or other group participants) may rely on synthetized consensus state data. Therefore, the value and usefulness of such synthesized data may depend on the level of trust placed in the synthetized consensus state data by the participants. Because trust is dependent on transparency and consensus various ones of the implementations discussed herein utilize technical options that increase technical transparency and/or achieve technical consensus. Further, because the value and usefulness of live synthesized consensus data may depend on the consensus data being produced before conditions change such that the data is rendered stale, the various ones of the implementations discussed herein utilize technical options that increase computational efficiency through data conversion and generation of specialized data structures.

A type of imputed variability consensus data that may be synthesized from request and counter-request electronic data messages includes boundary level data. For a given execution value and given operational conditions for a requested (or counter-requested) operation, a boundary level represents the imputed variability level that forms a border between request electronic data messages and counter-request electronic data messages. In other words, the imputed variability level at which electronic data messages on one side of the boundary level are expected to be request electronic data messages and electronic data messages on the other side of that boundary level are expected to be counter-request electronic data messages.

Plotting these boundary levels versus execution value may be used to generate an imputed variability curve. The imputed variability curve may be used in various example contexts. For example, where bid and ask offers in a financial products markets are transmitted using request and counter-request electronic data, the imputed variability boundary level output may be interpreted as implied volatility curve data.

To implement boundary level type consensus data synthesis for electronic data messages, technical arrangements may be selected. Technical arrangements for an implementation may affect various technical implementation characteristics. For example, a technical arrangement may affect how, when, and what memory locations are accessed; which operations are performed on the data stored in those memory locations; how data is formatted, converted, and/or handled; and which order such operations are performed. Technical arrangements may affect operational efficiency, calculation accuracy, computational load, memory usage, system transparency, and various other technical characteristics. Thus, technical arrangements further improve the operation of the underlying hardware. For the purposes of illustration, two example technical arrangements are discussed below.

Time-interval-specific support vector machine generation arrangement—As an example of a technical arrangement for implementation of a boundary level type consensus data synthesis system, boundary level data may be determined by generating a time-interval-specific support vector machine based on electronic data messages from a specified time interval and then applying dummy data to the generated time-interval-specific support vector machine. In various implementations, using this technical arrangement, request and counter-request electronic data messages from a specified time interval may be obtained. Request or counter-request values from each of the counter-request electronic data messages may be transformed into imputed variability levels using various transformation models. For each of the electronic data messages, an input code may be generated to indicate the electronic data message type (e.g., either request or counter-request), the execution value for the electronic data message, and the imputed variability level for the electronic data message. The input codes may be applied using a support machine training algorithm to a support vector machine, which may be initialized from a predetermined initial state. After generation of the support vector machine (e.g., through application of each of the input codes), dummy data may be classified by the time-interval-specific support vector machine to show the boundary levels at which classification of the dummy data points switches from request to counter-request for a selected group of execution values.

In various implementations, generation of the support vector machine may occur without first determining imputed variability levels, rather request and counter-request values may be used (e.g., the operations may be performed in "request-value-space" rather than "imputed-variability-space"). To obtain the boundary imputed variability levels, the request-value-space boundary may be transformed into imputed variability levels after generation by the support vector machine.

Image-transformation via artificial neural network arrangement—As another example of a technical arrangement for implementation of a boundary level type consensus data synthesis system, boundary level data may be determined by converting data from request and counter request messages into an image (for example, by plotting the data and converting the plotted data into an image data format) and then applying the image to a trained artificial neural network for transformation of the image. The trained artificial neural network may be trained to transform the image to add a visible boundary representing the boundary levels to the image. The output image may be reverse-transformed into data (e.g., by using image pixel data to generate a plot and then extracting the plotted points) to determine the boundary levels versus execution value.

The artificial neural network may be trained using expert generated analysis. For example, multiple pairs of input/output images may be applied to the neural network during training. The input may include an image representing imputed variability levels from the request and counter-request electronic data messages plotted versus execution value. The paired output may include image of the same plot with a boundary drawn as calculated by an expert. In some cases, boundaries drawn by multiple different experts may be used to train the artificial neural network toward consensus among the multiple experts. In some cases, many training image pairs may be used. For example, 20, 100, 1000, or more image pairs may be used depending on the expected complexity of the data sets. After training, the artificial neural network may be used to generate boundary levels, which may be consistent with expert-drawn boundaries, on images representing groups of electronic data messages that may be different from any that were used in training the artificial neural network.

In some implementations, specific artificial neural network types may be used. For example, a convolutional neural network specialized from image transformation may be used. For example, an efficient Unet network may be used. Further, pre-training transfer learning may be used to generate the neural network in an initial state primed from image transformation. In transfer learning, one or more hidden layers (e.g., layers between the input and output layers of the neural network) may be transferred from an existing neural network. In some cases, a specialized execution platform may be used. For example, a graphics processing unit (GPU) or a more specialized tensor processor unit (TPU) may be used for execution of the neural network. Because neural networking involve matrix and/or tensor operations, GPUs and especially TPUs may offer increased performance for these specialized computer operations.

Referring again to the time-interval-specific support vector machine generation arrangement, in some cases, a specialized execution platform may be used. For example, the classification operations on the dummy data may be performed using a GPU. The specialization of GPUs for preforming a uniform set of operations on many data points simultaneously may provide an advantage when performing the same classification operation on multiple dummy data points. General purpose processors may be able to perform such operations, but may have slower execution times with comparatively larger electrical power expenditures because of the lack of specialization of such processors for uniform parallel operations.

Selection of a technical arrangements may result in technical differences with systems utilizing a different arrangement. As an example, a system using the time-interval-specific support vector machine generation arrangement may transform request and counter-request electronic message data into input codes include various indicators of values determined from the messages for input to support generation of the support vector machine. As a contrasting example, a system using the image-transformation via artificial neural network arrangement, may translate the request and counter-request electronic message data into image data for processing by the neural network. Further, the time-interval-specific support vector machine generation arrangement includes generation of a support vector machine specific to the a given time interval (or other defined set of data points). The image-transformation via artificial neural network arrangement instead uses a neural network that is non-specific and may be reused across data sets. Thus, selection of a technical arrangement may result in the implementation of technical features that are tied to the technical arrangement rather than being independently associated with the task of imputed variability calculation generally.

Further, support vector machine generation may offer different technical advantages than other technical arrangements. Generated support vector machines may be transferred between execution platforms. Although certain platforms may have advantages in execution efficiency of the ordered combinations of steps discussed herein via specialized hardware, support vector machines may have consistent accuracy and results among a variety of platforms. Further, because the support vector machines are time-interval-specific, transferring the underlying data from the electronic data messages may be sufficient to support local generation of support vector machines based on the provided interval-specific data. Accordingly, support vector machine generation technical arrangements may facilitate transparency because results can be verified via local execution of support vector machines. Additionally or alternatively, transparency can be increase through 'ground up' generation of the time-interval-specific support vector machine. Thus, participants can be assured of fair implementation by verifying results on their own systems.

Artificial neural networks may offer less transparency due to the existence of some hardware-variant operations associated with artificial neural networks. Further, training may be difficult to reproduce on varying hardware platforms with artificial neural networks. Nevertheless, because artificial neural networks may allow for creation of consensus results based on previous expert input, technical trust may be present when participant experts review results from the artificial neural networks and note that results are consistent with expert consensus.

As an illustrative context for the techniques and architectures discussed herein, one exemplary environment where inaccurate request operation detection and mitigation is desirable is in financial markets, and in particular, electronic financial exchanges, such as a futures exchange, such as the Chicago Mercantile Exchange Inc. (CME). A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Such standardization may improve the liquidity of these contracts, e.g. the case with which such contracts may be bought or sold. In implementations described herein, terms and conditions of each futures contract may be partially standardized as to the specification of the contract's underlying reference commodity and attributes thereof. Options on futures may be similarly standardized as to, for example, quantity, strike price and expiration/maturity. The underlying reference commodity may include a range of possible qualities, quantities, delivery dates, and other attributes. For a spot market transaction, the underlying quality and attributes may be set, while a futures contract may provide predetermined offsets to allow for possible settlement of a non-conforming delivery. Physical settlement requires actual delivery of the underlying asset according to the contract terms. Cash settlement, by contrast, is a method of settling a futures contract whereby the parties effect final settlement when the contract expires by paying/receiving the loss/gain related to the contract in cash, rather than by effecting physical sale and purchase of the underlying reference commodity at a price determined by the futures contract. Options and futures may be based on more generalized market indicators, such as stock indices, interest rates, futures contracts and other derivatives.

The disclosed embodiments are drawn to systems and methods that include specific computing components; each being specially programmed to perform a technological function as part of a greater technological process. The disclosed embodiments include separate system components interconnected in a specific way to implement aspects of the disclosed system and include sufficient specific structure and function and, as such, are not drawn to an abstract idea.

The disclosed embodiments are not directed to any method for "obtaining, transforming and determining." which is involved in all computing functionality. The disclosed embodiments and features recited in this regard provide numerous advantages. The instant embodiments do not preempt all methods of "obtaining, transforming, and determining." and are specifically directed towards the disclosed functionality. The disclosed embodiments implement specific rules and features that improve the operation of a particular genus of a technological process, which does not preempt all techniques of obtaining, transforming and determining, which, at some level, is part of every computing process.

The disclosed embodiments may be implemented in a data transaction processing system that processes data items or objects, such as an exchange computing system as described in more detail below. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined equations. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. The specifically configured matching processors may additionally generate information indicative of a state of an environment (e.g., the state of the order book) based on the processing and report this information to data recipient computing systems via outbound messages published via one or more data feeds.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and reduces risk of financial loss to each transacting party due to breach of contract by assuring performance on each contract. A clearing member is a firm qualified to clear trades through the clearing house.

An exchange computer system which operates under a central counterparty model acts, e.g., using the clearing mechanism described above, as an intermediary between market participants for the transaction of financial instruments. In particular, the exchange computer system interposes itself into the transactions between the market participants, i.e., splits a given transaction between the parties into two separate transactions where the exchange computer system substitutes itself as the counterparty to each of the parties for that part of the transaction. In this way, the exchange computer system acts as a guarantor and central counterparty and there is no need for the market participants to disclose their identities to each other, or subject themselves to credit or other investigations by a potential counterparty, as is done with bilateral trading. For example, the exchange computer system insulates one market participant from the default by another market participant. Market participants need only meet the requirements of the exchange computer system. Anonymity among the market participants further encourages a more liquid market environment as there are lower barriers to participation. The exchange computer system can accordingly offer benefits such as centralized and anonymous matching and clearing.

A "Clearing House," which is typically an adjunct to the Exchange and may be an operating division thereof, is responsible for settling trading accounts, clearing trades, collecting and maintaining performance bond funds, regulating delivery, and reporting trading data to market regulators and to the market participants. An essential role of the clearing house is to mitigate credit risk via the clearing process. Clearing is the procedure through which the Clearing House becomes buyer to each seller of a futures contract, and seller to each buyer, also referred to as a "novation," and assumes responsibility for protecting buyers and sellers from financial loss due to breach of contract, by assuring performance on each contract. A clearing member is a firm qualified to clear trades through the clearing house.

Electronic financial instrument trading systems may allow traders to submit orders (or other request operations) and receive confirmations, market data, and other information electronically via a network. These "electronic" marketplaces implemented by, and also referred to as, "electronic trading systems," are an alternative trading forum to pit based trading systems whereby the traders, or their representatives, all physically stand in a designated location, i.e. a trading pit, and trade with each other via oral and hand based communication.

The speed at which trades are executed through electronic trading systems provide many benefits. Electronic trading systems can facilitate a large number of market transactions. The greater the number of market transactions, the greater a market's liquidity. In liquid markets, prices are driven by competition, prices reflect a consensus of an investment's value, and trading systems provide a free and open dissemination of information. With the advent of improved computational and communications capabilities, the speed and efficiency with which traders may receive information and trade in electronic trading systems has greatly improved. Algorithmic and high frequency trading utilize computers to quickly analyze market information and place trades allowing traders to take advantage of even the smallest movements in prices.

For example, if the current matching algorithm is First-In-First-Out ("FIFO"), also referred to as Price-Time, the algorithm may be changed to Pro-Rata. Other algorithms which may be used include Price Explicit Time, Order Level Pro Rata, Order Level Priority Pro Rata, Preference Price Explicit Time, Preference Order Level Pro Rata, Preference Order Level Priority Pro Rata, Threshold Pro-Rata, Priority Threshold Pro-Rata, Preference Threshold Pro-Rata, Priority Preference Threshold Pro-Rata, Split Price-Time Pro-Rata. See, for example, U.S. patent application Ser. No. 13/534,399 entitled "Multiple Trade Matching Algorithms" herein incorporated by reference in its entirety and relied upon.

A match engine module, such as one implemented by CME, may be centralized and coupled to multiple inputs from customers, and behave deterministically, e.g., programmed to depend on state, inputs and outputs. The rapid speed of automated trading systems implementing such a centralized, deterministic match engine, where all customers or traders can access a central limit order book for a product, can quickly result in a product state that does not reflect a true consensus or desirable state of the product. Accordingly the resulting problem is a problem arising in computer systems due to the high speeds of computer systems. The solutions disclosed herein are, in various implementations, implemented as automatic responses and actions by an exchange computing system computer.

The market parameter(s), or derivations thereof, monitored for movement, the basis for determination of a qualifying magnitude of movement, and/or the duration of the requisite period of time over which a qualifying change may occur, may be configurable, as will be described, and implementation dependent, so as to allow various implementations to balance performance versus the ability to accurately discriminate between extreme movements in the market which are reflective of valid market operation from those that are not.

While various implementations may be described in some examples with respect to a product by product or market by market implementation, e.g. implemented for each market/order book, it will be appreciated that the disclosed implementations may be applied across markets for multiple products traded on one or more electronic trading systems, such as by monitoring an aggregate, correlated or other derivation of the relevant indicative parameters as described herein.

While various implementations may be described in some examples with respect to futures and/or options on futures trading, it should be appreciated that the disclosed implementations may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancelations, etc., in a manner as expected by the market participants, such as based on market data, e.g., prices, available counter-orders, etc., to provide an expected level of certainty that transactions will occur in a consistent and predictable manner and without unknown or unascertainable risks. In addition, it should be appreciated that electronic trading systems further impose additional expectations and demands by market participants as to transaction processing speed, latency, capacity and response time, while creating additional complexities relating thereto. Accordingly, as will be described, the disclosed implementations may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer an efficient, fair and balanced market where market prices reflect a true consensus of the value of traded products among the market participants. Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to a request to buy or sell a product in a particular electronic marketplace, and the action associated with the message may indicate that the order is to be placed in the electronic marketplace such that other request operations which were previously placed may potentially be matched to the request operation of the received message. Thus the electronic marketplace may conduct market activities through electronic systems.

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by customers with their brokers, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. In some cases, the current prices may be determined based on values taken from an implied volatility curve, which may be calculated using the techniques and architectures for boundary level imputed variability curve determination discussed herein. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

Various implementations recognize that electronic messages such as incoming request messages from market participants, e.g., trade request messages, etc., are sent from market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market.

As used herein, a financial message, or an electronic message, refers both to messages communicated by market participants to an electronic trading or market system and vice versa. The messages may be communicated using packeting or other techniques operable to communicate information between systems and system components. Some messages, e.g., request messages, may be associated with actions to be taken in the electronic trading or market system. Financial messages communicated to the electronic trading system, also referred to as "inbound" messages, may include associated actions that characterize the messages, such as trader orders, order modifications, order cancelations and the like, as well as other message types. Financial messages communicated from the electronic trading system, referred to as "outbound" messages, may include messages responsive to inbound messages, such as confirmation messages, or other messages such as market update messages, quote messages, and the like.

Outstanding (unmatched, wholly unsatisfied/unfilled or partially satisfied/filled) orders are maintained in one or more data structures or databases referred to as "order books," such orders being referred to as "resting." and made visible, i.e., their availability for trading is advertised, to the market participants through electronic notifications/broadcasts, referred to as market data messages or feeds. An order book, i.e., an order book database or data structure, is typically maintained for each product, e.g. instrument, traded on the electronic trading system and generally defines or otherwise represents the state of the market for that product, i.e. the current prices at which the market participants are willing buy or sell particular quantities of that product. As such, as used herein, an order book for a product may also be referred to as a market for that product. At any given time, an order book, or the market represented thereby, may be characterized by a state, i.e., the data records stored therein at that time which are indicative of the currently pending orders to buy or sell the particular products at particular quantities, and that state may change over time, i.e., as pending orders to buy/sell are at least partially satisfied by incoming counter orders resulting in updating, e.g., to reflect remaining available quantity, etc., or removing existing data records, as order modifications or cancelations are received and/or as new orders are received and data records indicative thereof are created.

A market data feed, also referred to as market data or a market feed, is a compressed or uncompressed real time (with respect to market events), or substantial approximation thereof, data/message stream, i.e., sequence of event generated messages, provided by the Exchange directly, or via a third party intermediary. A market data feed may be comprised of individual messages, each comprising one or more packets or datagrams, and may carry, for example, pricing or other information regarding orders placed, traded instruments and other market information, e.g., data indicative of a change in the state of the order book database, such as summary values and statistical values, or combinations thereof created in real time, e.g., at the time of the change in state or substantially proximate thereto, and may be transmitted, e.g. multi-casted, to the market participants using standardized protocols, such as UDP over Ethernet.

More than one market data feed, each, for example, carrying different information, may be provided as will be described. The standard protocol that is typically utilized for the transmission of market data feeds is the Financial Information Exchange (FIX) protocol Adapted for Streaming (FAST), aka FIX/FAST, which is used by multiple exchanges to distribute their market data. It will be appreciated that other protocols may be used. Pricing/quantity information conveyed by the market data feed may include the prices/quantities, or changes thereto, of resting orders, prices at which particular orders were recently traded and/or quantities thereof, or other information representative of the state of the order book database/market or changes therein at the time that the market data was generated. Separate, directed/private, messages may also be transmitted directly to market participants to confirm receipt of orders, cancellation of orders and otherwise provide acknowledgment or notification of matching and other events relevant, or otherwise privy, only to the particular market participant.

As may be perceived/experienced by the market participants from outside the Exchange or electronic trading system operated thereby, the following sequence describes how, at least in part, information may be propagated in such a system and how orders may be processed:

(1) An opportunity is created at a matching engine of the Exchange, such as by placing a recently received but unmatched order, e.g. a data record indicative thereof, on the order book to rest;

(2) The matching engine creates an update reflecting the opportunity, e.g., based on the change in the state of the order book database, and sends it to a feed engine;

(3) The feed engine, also referred to herein as a data publisher, generates an electronic data message comprising data indicative of the update and multicasts it to all of the market participants to advertise the opportunity to trade;

(4) The market participants receive the data message and evaluate the opportunity and each, upon completion of their evaluation, may or may not choose to respond with an electronic trade order message comprising data indicative of a trade order responsive to the resting order, i.e. counter to the resting order;

(5) The Exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed. This causes another change in the state of the order book database which may again, trigger this cycle.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereof, or rested. The response may further include a message to all market participants reporting a change in the order book due to the order. This response may take the form of a report of the specific change to the order book, e.g., an order for quantity X at price Y was added to the book (referred to as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

While various implementations may be described in some examples with reference to the CME, it should be appreciated that these implementations are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

While various implementations may be described in some examples with reference to a clearing house or exchange for purposes of enforcing a performance bond or margin requirement, other systems may be used. For example, a market participant may use the disclosed implementations in a simulation or other analysis of a portfolio. In such cases, the settlement price may be useful as an indication of a value at risk and/or cash flow obligation rather than a performance bond. The disclosed implementations may also be used by market participants or other entities to forecast or predict the effects of a prospective position on the margin requirement of the market participant.

The methods and systems described herein may be integrated or otherwise combined with various risk management methods and systems, such as the risk management methods and systems described in U.S. Pat. No. 7,769,667 entitled "System and Method for Activity Based Margining", the entire disclosure of which is incorporated by reference herein and relied upon. For example, the methods and systems described herein may be configured as a component or module of the risk management systems described in the above-referenced patent. Alternatively or additionally, the disclosed methods may generate data to be provided to the systems described in the above-referenced patent. For example, the settlement prices determined by the disclosed implementations may be incorporated into margin requirement(s) determined by the risk management method or system.

In various implementations, the discussed architectures and techniques may be integrated or otherwise combined with the risk management system implemented by CME called Standard Portfolio Analysis of Risk™ (SPAN®). The SPAN system bases performance bond requirements on the overall risk of the portfolios using parameters as determined by CME's Board of Directors, and thus represents a significant improvement over other performance bond systems, most notably those that are "strategy-based" or "delta-based." Further details regarding SPAN are set forth in the above-referenced patent.

The implementations may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed implementations, e.g., the market participants, may be referred to by other nomenclature, such as clearing firm or clearing entity, reflecting the role that the particular entity is performing with respect to the disclosed implementations and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B> . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the example computer 200 described below with respect to FIG. 2. A user database 102 may be provided which includes information identifying traders and other users of exchange computer system 100, such as account numbers or identifiers, usernames and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage or maintain one or more margining mechanisms implemented by the exchange computer system 100. Such administration, management or maintenance may include managing a number of database records reflective of margin accounts of the market participants. In some implementations, the risk management module 134 implements one or more aspects of the disclosed implementations, including, for instance, principal component analysis (PCA) based margining, in connection with interest rate swap (IRS) portfolios, as described below.

An order processing module 136 may be included to decompose delta-based, spread instrument, bulk and other types of composite orders for processing by the order book module 110 and/or the match engine module 106. The order processing module 136 may also be used to implement one or more procedures related to clearing an order.

A message management module 140 may be included to, among other things, receive, and extract orders from, electronic messages as is indicated with one or more aspects of the disclosed implementations.

A settlement module 142 (or settlement processor or other payment processor) may be included to provide one or more functions related to settling or otherwise administering transactions cleared by the exchange. Settlement module 142 of the exchange computer system 100 may implement one or more settlement price determination techniques. Settlement-related functions need not be limited to actions or events occurring at the end of a contract term. For instance, in some implementations, settlement-related functions may include or involve daily or other mark to market settlements for margining purposes. In some cases, the settlement module 142 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 142 may be used to determine a mark to market amount on a daily basis during the term of the financial instrument. Such determinations may also be made on a settlement date for the financial instrument for the purposes of final settlement.

In some implementations, the settlement module 142 may be integrated to any desired extent with one or more of the other modules or processors of the exchange computer system 100. For example, the settlement module 142 and the risk management module 134 may be integrated to any desired extent. In some cases, one or more margining procedures or other aspects of the margining mechanism(s) may be implemented by the settlement module 142.

It should be appreciated that concurrent processing limits may be defined by or imposed separately or in combination, as was described above, on one or more of the trading system components, including the user database 102, the account data module 104, the match engine module 106, the trade database 108, the order book module 110, the market data module 112, the risk management module 134, the order processing module 136, the message management module 140, the settlement module 142, or other component of the exchange computer system 100.

In various implementations, the message management module 140, as coupled with the order book module 110, may be configured for receiving a plurality of electronic request messages, each of the plurality of messages having an associated action to be executed within a designated period of time having a beginning time and an ending time, wherein at least one electronic request message of the plurality of electronic request messages comprises data representative of a particular time between the beginning and end of the period of time at which the action associated with the at least one electronic request message is to be executed. The exchange computer system 100 may then be further configured to execute the action associated with the at least one temporally specific message at the particular time.

The message management module 140 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure.

As will be described, the disclosed boundary level type consensus data synthesis system may be implemented as part of the risk management module 134, in various implementations. However, it will be appreciated that the disclosed mechanisms may be implemented at any logical and/or physical point(s), or combinations thereof, at which the relevant information/data may be monitored or is otherwise accessible or measurable, including one or more gateway devices, modems, the computers or terminals of one or more market participants, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example the modules may be embodied as part of an exchange 100 for financial instruments. It should be appreciated the disclosed implementations may be implemented as a different or separate module of the exchange computer system 100, or a separate computer system coupled with the exchange computer system 100 so as to have access to margin account record, pricing, and/or other data.

As described above, the disclosed implementations may be implemented as a centrally accessible system or as a distributed system, e.g., where the disclosed functions are performed by a cloud-based deployment, where some of the disclosed functions are performed by the computer systems of the market participants and/or via hardware located at multiple distinct physical locations.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via WiFi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one implementation, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

As shown in FIG. 1, the exchange computer system 100 further includes a message management module 140 which may implement, in conjunction with the market data module 112, the disclosed mechanisms for managing electronic messages containing financial data sent between an exchange and a plurality of market participants, or vice versa.

Figure 1A:
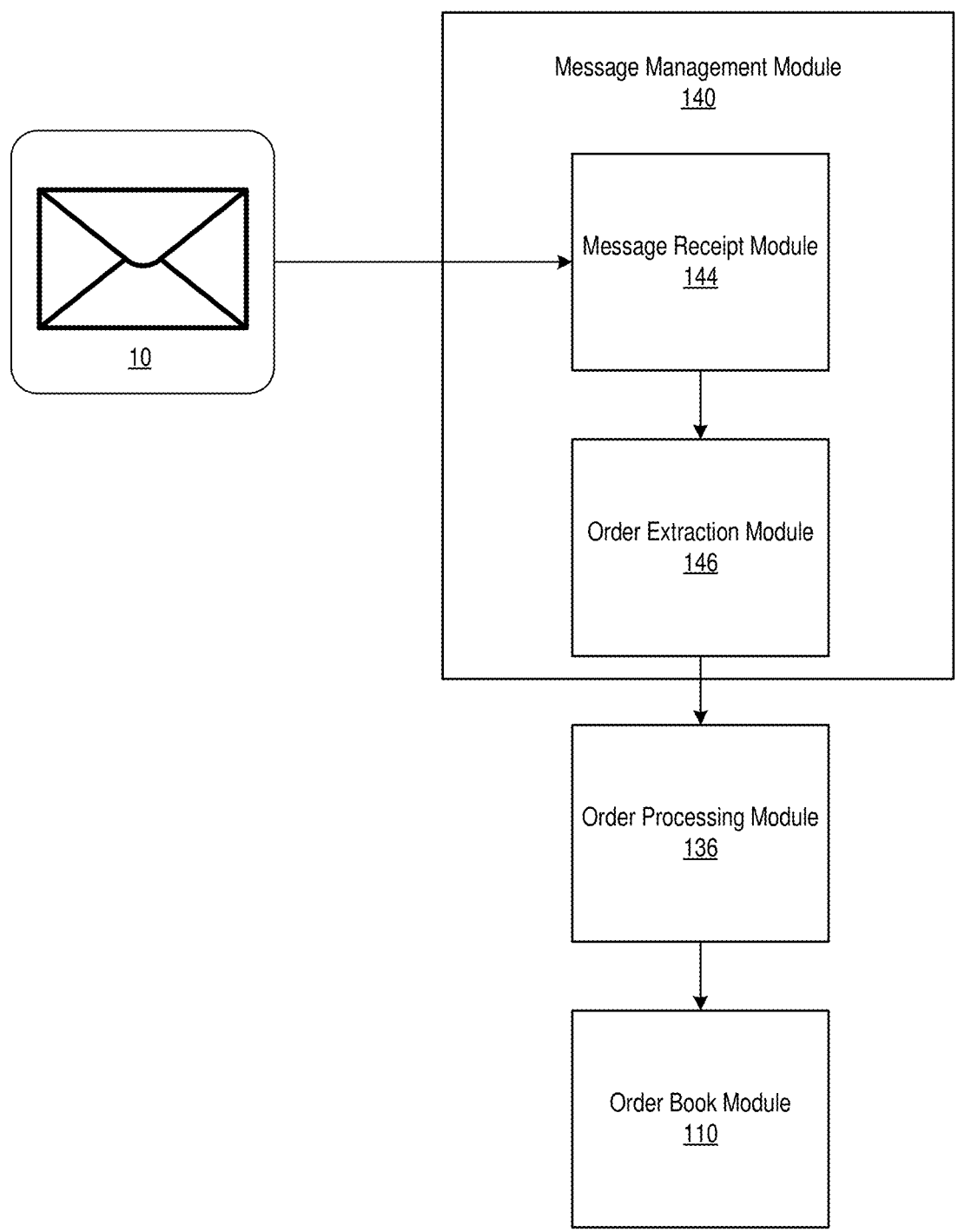
FIG. 1A shows an illustrative implementation of market order message management for use with various implementations.

FIG. 1A illustrates an implementation of market order message management as implemented using the message management module 140 and order book module 110 of the exchange computer system 100. As such, a message 10 may be received from a market participant at the exchange computer system 100 by a message receipt module 144 of the message management module 140. The message receipt module 144 processes the message 10 by interpreting the content of the message based on the message transmit protocol, such as the transmission control protocol ("TCP"), to provide the content of the message 10 for further processing by the exchange computer system.

Further processing may be performed by the order extraction module 146. The order extraction module 146 may be configured to detect, from the content of the message 10 provided by the message receipt module 144, characteristics of an order for a transaction to be undertaken in an electronic marketplace. For example, the order extraction module 146 may identify and extract order content such as a price, product, volume, and associated market participant for an order. The order extraction module 146 may also identify and extract data indicating an action to be executed by the exchange computer system 100 with respect to the extracted order. The order extraction module may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buy or sell) or time in force (e.g., a good until end of day order that is good for the full trading day, a good until canceled ordered that rests on the order book until matched, or a fill or kill order that is canceled if not filled immediately).

The order may be communicated from the order extraction module 146 to an order processing module 136. The order processing module 136 may be configured to interpret the communicated order, and manage the order characteristics, other information, and associated actions as they are processed through an order book module 110 and eventually transacted on an electronic market. For example, the order processing module 136 may store the order characteristics and other content and execute the associated actions. In an implementation, the order processing module may execute an associated action of placing the order into an order book for an electronic trading system managed by the order book module 110. In an implementation, placing an order into an order book and/or into an electronic trading system may be considered a primary action for an order. The order processing module 136 may be configured in various arrangements, and may be configured as part of the order book module 110, part of the message management module 140, or as an independent functioning module.

The implementations described herein utilize trade related electronic messages such as mass quote messages, individual order messages, modification messages, cancelation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one implementation, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange 100 includes a place or system that receives and/or executes orders.

Figure 2:
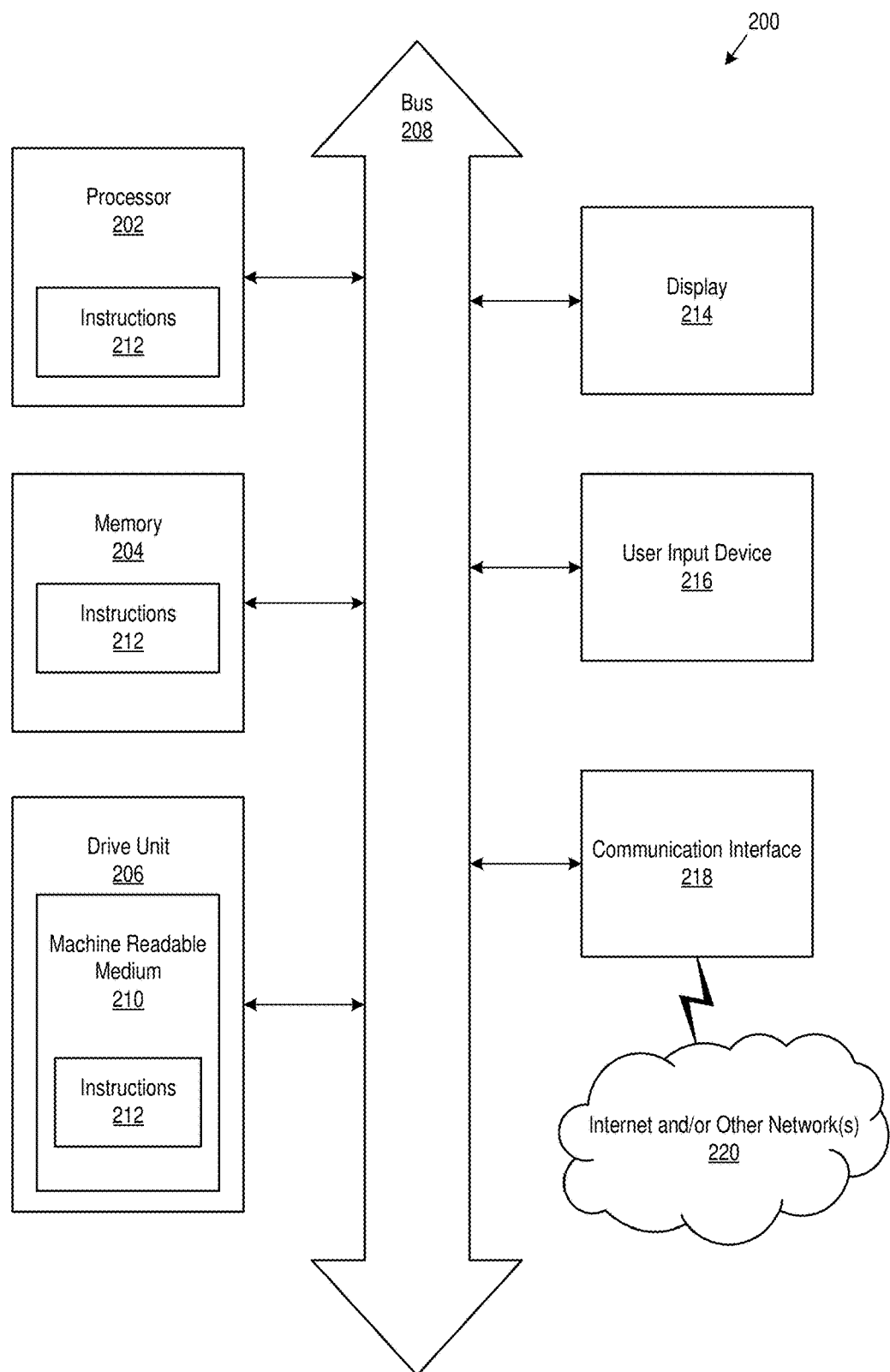
FIG. 2 shows an illustrative implementation of a general computer system configured for use with various implementations.

Referring to FIG. 2, an illustrative implementation of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed implementations are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 204 includes a cache or random access memory for the processor 202. In alternative implementations, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular implementation, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular implementation, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary implementation, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated or otherwise specifically configured hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit.

Accordingly, the present system encompasses software, firmware, and hardware implementations.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the techniques and architectures are not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. The instructions govern the operation of the processor thereby transforming the processor into a special purpose device. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and optical media (CD-ROM, DVD-ROM, Blu-Ray, or other optical media). The processor and the memory can be supplemented by, or incorporated in, special purpose logic circuitry.

To provide for interaction with a user, implementations of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Implementations of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed implementations may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 220 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

In an implementation, electronic messages are received from the network. The electronic message packets may be received at a network interface for the electronic messaging system. The electronic messages may be sent from client devices, for example client devices of participants in a market. The messages may include request characteristics and be associated with actions to be executed with respect to a request that may be extracted from the request characteristics. The action may involve any action as associated with transacting the request (which may be, for example, an order in an electronic trading system). The actions may involve placing the orders within a particular market and/or order book of a market in the electronic trading system.

In various implementations, a market may operate using characteristics that involve collecting orders over a period of time, such as a batch auction market. In such an implementation, the period of time may be considered an order accumulation period. The period of time may involve a beginning time and an ending time, with orders (or other request operations) placed in the market after the beginning time, and the placed order matched at or after the ending time. As such, the action associated with an order extracted from a message may involve placing the order in the market within the period of time. Also, electronic messages may be received prior to or after the beginning time of the period of time.

The electronic messages may also include other data relating to the order. In an implementation, the other data may be data indicating a particular time in which the action is to be executed. As such, the order may be considered a temporally specific order. The particular time in which an action is undertaken may be established with respect to any measure of absolute or relative time. In an implementation, the time in which an action is undertaken may be established with reference to the beginning time of the time period or ending time of the time period in a batch auction implementation. For example, the particular time may be a specific amount of time, such as 10 milliseconds, prior to the ending time of an order accumulation period in the batch auction. Further, the order accumulation period may involve dissecting the accumulation period into multiple consecutive, overlapping, or otherwise divided, sub-periods of time. For example, the sub-periods may involve distinct temporal windows within the order accumulation period. As such, the particular time may be an indicator of a particular temporal window during the accumulation period. For example, the particular time may be specified as the last temporal window prior to the ending time of the accumulation period.

In an implementation, the electronic message may also include other actions to be taken with respect to the order. These other actions may be actions to be executed after the initial or primary action associated with the order. For example, the actions may involve modifying or canceling an already placed order. Further, in an implementation, the other data may indicate order modification characteristics. For example, the other data may include a price or volume change in an order. The other actions may involve modifying the already placed order to align with the order modification characteristics, such as changing the price or volume of the already placed order.

In an implementation, other actions may be dependent actions. For example, the execution of the actions may involve a detection of an occurrence of an event. Such triggering events may be described as other data in the electronic message. For example, the triggering event may be a release of an economic statistic from an organization relating to a product being bought or sold in the electronic market, a receipt of pricing information from a correlated electronic market, a detection of a change in market sentiment derived from identification of keywords in social media or public statements of official related to a product being bought or sold in the electronic market, and/or any other event or combination of events which may be detected by an electronic trading system.

In an implementation, the action, or a primary action, associated with an order may be executed. For example, an order extracted from electronic message order characteristics may be placed into a market, or an electronic order book for a market, such that the order may be matched with other order counter thereto.

In an implementation involving a market operating using batch auction principles, the action, such as placing the order, may be executed subsequent to the beginning time of the order accumulation period, but prior to the ending time of the order accumulation period. Further, as indicated above, a message may also include other information for the order, such as a particular time the action is to be executed. In such an implementation, the action may be executed at the particular time. For example, in an implementation involving a batch auction process having sub-periods during an order accumulation period, an order may be placed during a specified sub-period of the order accumulation period. The disclosed implementations may be applicable to batch auction processing, as well as continuous processing.

Also, it may be noted that messages may be received prior or subsequent to the beginning time of an order accumulation period. Orders extracted from messages received prior to the beginning time may have the associated actions, or primary actions such as placing the order, executed at any time subsequent to the beginning time, but prior to the ending time, of the order accumulation period when no particular time for the execution is indicated in the electronic message. In an implementation, messages received prior to the beginning time but not having a particular time specified will have the associated action executed as soon as possible after the beginning time. Because of this, specifying a time for order action execution may allow a distribution and more definite relative time of order placement so as to allow resources of the electronic trading system to operate more efficiently.

In various implementations, the execution of temporally specific messages may be controlled by the electronic trading system such that a limited or maximum number may be executed in any particular accumulation period, or sub-period. In an implementation, the order accumulation time period involves a plurality of sub-periods involving distinct temporal windows, a particular time indicated by a message may be indicative of a particular temporal window of the plurality of temporal windows, and the execution of the at least one temporally specific message is limited to the execution of a specified sub-period maximum number of temporally specific messages during a particular sub-period. The electronic trading system may distribute the ability to submit temporally specific message to selected market participants. For example, only five temporally specific messages may be allowed in any one particular period or sub-period. Further, the ability to submit temporally specific messages within particular periods or sub-periods may be distributed based on any technique. For example, the temporally specific messages for a particular sub-period may be auctioned off or otherwise sold by the electronic trading system to market participants. Also, the electronic trading system may distribute the temporally specific messages to preferred market participants, or as an incentive to participate in a particular market.

In various implementations, an event occurrence may be detected. The event occurrence may be the occurrence of an event that was specified as other information relating to an order extracted from an electronic message. The event may be a triggering event for a modification or cancelation action associated with an order. The event may be detected subsequent to the execution of the first action when an electronic message further comprises the data representative of the event and a secondary action associated with the order. In an implementation involving a market operating on batch auction principles, the event may be detected subsequent to the execution of a first action, placing an order, but prior to the ending time of an order accumulation period in which the action was executed.

In various implementations, other actions associated with an order may be executed. The other actions may be any action associated with an order. For example, the action may be a conditional action that is executed in response to a detection of an occurrence of an event. Further, in a market operating using batch auction principles, the conditional action may be executed after the placement of an order during an order accumulation period, but in response to a detection of an occurrence of an event prior to an ending time of the order accumulation period. In such an implementation, the conditional action may be executed prior to the ending time of the order accumulation period. For example, the placed order may be canceled, or modified using other provided order characteristics in the message, in response to the detection of the occurrence of the event.

An event may be a release of an economic statistic or a fluctuation of prices in a correlated market. An event may also be a perceptible change in market sentiment of a correlated market. A change may be perceptible based on a monitoring of orders or social media for keywords in reference to the market in question. For example, electronic trading systems may be configured to be triggered for action by a use of keywords during a course of ongoing public statements of officials who may be in a position to impact markets, such as Congressional testimony of the Chairperson of the Federal Reserve System.

The other, secondary, or supplemental action may also be considered a modification of a first action executed with respect to an order. For example, a cancelation may be considered a cancelation of the placement of the order. Further, a secondary action may have other data in the message which indicates a specific time in which the secondary action may be executed. The specific time may be a time relative to a first action, or placement of the order, or relative to an accumulation period in a batch auction market. For example, the specific time for execution of the secondary action may be at a time specified relative and prior to the ending period of the order accumulation period. Further, multiple secondary actions may be provided for a single order. Also, with each secondary action a different triggering event may be provided.

In various implementations, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an implementation, the financial product may be based on an associated financial instrument which the electronic market is established to trade.

In various implementations, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In various implementations, data relating to the received transaction is stored. The data may be stored in any device, or using any technique, operable to store and provide recovery of data. For example, a memory 204 or computer readable medium 210, may be used to store data, as is described above with respect to FIG. 2. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be saved. The data may be stored in any device, or using any technique, operable to store and provide recovery of data. For example, a memory 204 or computer readable medium 210, may be used to store data, as is described above with respect to FIG. 2. The acts of the process as described herein may also be repeated. As such, data for multiple received transactions for multiple market participants may be stored and used as describe herein.

The order processing module 136 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book database, as associated with particular market participants.

Also, the order processing module 136 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 136 may determine or otherwise calculate scores indicative of the quality value based on these stored extracted order characteristics, such as an MQI as described herein.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. This priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 136, and used for determining MQI scores of market participants.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

As such, both market participant types are useful in generating liquidity in a market, but specific characteristics of market activity taken by market participants may provide an indication of a particular market participant's effect on market liquidity. For example, a Market Quality Index ("MQI") of an order may be determined using the characteristics. An MQI may be considered a value indicating a likelihood that a particular order will improve or facilitate liquidity in a market. That is, the value may indicate a likelihood that the order will increase a probability that subsequent requests and transactions from other market participants will be satisfied. As such, an MQI may be determined based on a proximity of the entered price of an order to a midpoint of a current bid-ask price spread, a size of the entered order, a volume or quantity of previously filled orders of the market participant associated with the order, and/or a frequency of modifications to previous orders of the market participant associated with the order. In this way, an electronic trading system may function to assess and/or assign an MQI to received electronic messages to establish messages that have a higher value to the system, and thus the system may use computing resources more efficiently by expending resources to match orders of the higher value messages prior to expending resources of lower value messages.

While an MQI may be applied to any or all market participants, such an index may also be applied only to a subset thereof, such as large market participants, or market participants whose market activity as measured in terms of average daily message traffic over a limited historical time period exceeds a specified number. For example, a market participant generating more than 500, 1,000, or even 10,000 market messages per day may be considered a large market participant.

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The disclosed implementations recognize that electronic messages such as incoming messages from market participants, i.e., "outright" messages, e.g., trade order messages, etc., are sent from client devices associated with market participants, or their representatives, to an electronic trading or market system. For example, a market participant may submit an electronic message to the electronic trading system that includes an associated specific action to be undertaken by the electronic trading system, such as entering a new trade order into the market or modifying an existing order in the market.

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. Financial messages communicated to the electronic trading system, also referred to as "inbound" messages, may include associated actions that characterize the messages, such as trader orders, order modifications, order cancelations and the like, as well as other message types. Financial messages communicated from the electronic trading system, referred to as "outbound" messages, may include messages responsive to inbound messages, such as confirmation messages, or other messages such as market update messages, quote messages, and the like.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereof, or rested. The response may further include a message to all market participants reporting a change in the order book due to the order. This response may take the form of a report of the specific change to the order book, e.g., an order for quantity X at price Y was added to the book (referred to as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order, also known as an immediate or cancel order, or other conditional request may not have an immediate market impacting effect, if at all, until the requisite conditions are met.

Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting." and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

In the exemplary implementations, all transactions for a particular market may be ultimately received at the electronic trading system via one or more points of entry, e.g., one or more communications interfaces, at which the disclosed implementations apply determinism, which as described may be at the point where matching occurs, e.g., at each match engine (where there may be multiple match engines, each for a given product/market, or moved away from the point where matching occurs and closer to the point where the electronic trading system first becomes "aware" of the incoming transaction, such as the point where transaction messages, e.g., orders, ingress the electronic trading system. Generally, the terms "determinism" or "transactional determinism" may refer to the processing, or the appearance thereof, of orders in accordance with defined business rules. Accordingly, as used herein, the point of determinism may be the point at which the electronic trading system ascribes an ordering to incoming transactions/orders relative to other incoming transactions/orders such that the ordering may be factored into the subsequent processing, e.g., matching, of those transactions/orders as will be described. For more detail on deterministic operation in a trading system, see U.S. patent application Ser. No. 14/074, 675, filed on Nov. 7, 2013, published as U.S. patent application Publication Ser. No. U.S. Patent Publication No. 2015/0127516, entitled "Transactionally Deterministic High Speed Financial Exchange Having Improved, Efficiency, Communication, Customization, Performance, Access, Trading Opportunities, Credit Controls, And Fault Tolerance", the entirety of which is incorporated by reference herein and relied upon.

In various implementations, the disclosed system may include a Market Segment Gateway ("MSG") that is the point of ingress/entry and/or egress/departure for all transactions, i.e., the network traffic/packets containing the data therefore, specific to a single market at which the order of receipt of those transactions may be ascribed. An MSG or Market Segment Gateway may be utilized for the purpose of deterministic operation of the market. The electronic trading system may include multiple MSGs, one for each market/product implemented thereby.

For example, a participant may send a request for a new transaction, e.g., a request for a new order, to the MSG. The MSG extracts or decodes the request message and determines the characteristics of the request message.

The MSG may include, or otherwise be coupled with, a buffer, cache, memory, database, content addressable memory, data store or other data storage mechanism, or combinations thereof, which stores data indicative of the characteristics of the request message. The request operation is passed to the transaction processing system, e.g., the match engine.

Upon receipt of an incoming order to trade in a particular financial instrument, whether for a single-component financial instrument, e.g., a single futures contract, or for a multiple-component financial instrument, e.g., a combination contract such as a spread contract, a match engine, as will be described in detail below, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both of the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data, as was described above, reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one implementation, two orders match because one order includes instructions for or specifies buying a quantity of a particular instrument at a particular price, and the other order includes instructions for or specifies selling (a different or same) quantity of the instrument at a same or better price.

The exchange computer system, as will be described below, monitors incoming orders received thereby and attempts to identify, i.e., match or allocate, as will be described in more detail below, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

Stop orders also rest on, or are maintained in, an order book to monitor for a trade at the stop price, which triggers an attempted trade at the limit price. In one implementation, a triggered limit price for a stop order may be treated as an incoming order in some of the methods described herein.

Upon identification (matching) of a contra order(s), a minimum of the quantities associated with the identified order and the incoming order is matched and that quantity of each of the identified and incoming orders become two halves of a matched trade that is sent to a clearinghouse. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming. i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

As was noted above, an exchange must respond to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/ allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include:

Price Explicit Time
Order Level Pro Rata
Order Level Priority Pro Rata
Preference Price Explicit Time
Preference Order Level Pro Rata
Preference Order Level Priority Pro Rata
Threshold Pro-Rata
Priority Threshold Pro-Rata
Preference Threshold Pro-Rata
Priority Preference Threshold Pro-Rata
Split Price-Time Pro-Rata For example, the Price Explicit Time trading policy is based on the basic Price Time trading policy with Explicit Orders having priority over Implied Orders at the same price level. The order of traded volume allocation at a single price level may therefore be:

Explicit order with oldest timestamp first. Followed by
Any remaining explicit orders in timestamp sequence (First In, First Out—FIFO) next. Followed by
Implied order with oldest timestamp next. Followed by
Any remaining implied orders in timestamp sequence (FIFO).

In Order Level Pro Rata, also referred to as Price Pro Rata, priority is given to orders at the best price (highest for a bid, lowest for an offer). If there are several orders at this best price, equal priority is given to every order at this price and incoming business is divided among these orders in proportion to their order size. The Pro Rata sequence of events is:

1. Extract all potential matching orders at best price from the order book into a list.
2. Sort the list by order size, largest order size first. If equal order sizes, oldest timestamp first. This is the matching list.
3. Find the 'Matching order size, which is the total size of all the orders in the matching list.
4. Find the 'tradable volume', which is the smallest of the matching volume and the volume left to trade on the incoming order.
5. Allocate volume to each order in the matching list in turn, starting at the beginning of the list. If all the tradable volume gets used up, orders near the end of the list may not get allocation.
6. The amount of volume to allocate to each order is given by the formula:

(Order volume/Matching volume)*Tradable volume

The result is rounded down (for example, 21.99999999 becomes 21) unless the result is less than 1, when it becomes 1.

7. If tradable volume remains when the last order in the list had been allocated to, return to step 3.

Note: The matching list is not re-sorted, even though the volume has changed. The order which originally had the largest volume is still at the beginning of the list.

8. If there is still volume left to trade on the incoming order, repeat the entire algorithm at the next price level.

Order Level Priority Pro Rata, also referred to as Threshold Pro Rata, is similar to the Price (or 'Vanilla') Pro Rata algorithm but has a volume threshold defined. Any pro rata allocation below the threshold will be rounded down to 0. The initial pass of volume allocation is carried out in using pro rata; the second pass of volume allocation is carried out using Price Explicit Time. The Threshold Pro Rata sequence of events is:

1. Extract all potential matching orders at best price from the order book into a list.
2. Sort the list by explicit time priority, oldest timestamp first. This is the matching list.
3. Find the 'Matching volume', which is the total volume of all the orders in the matching list.
4. Find the 'tradable volume', which is the smallest of the matching volume and the volume left to trade on the incoming order.
5. Allocate volume to each order in the matching list in turn, starting at the beginning of the list.
6. The amount of volume to allocate to each order is given by the formula:

(Order volume/Matching volume)*Tradable volume

The result is rounded down to the nearest lot (for example, 21.99999999 becomes 21) unless the result is less than the defined threshold in which case it is rounded down to 0.

7. If tradable volume remains when the last order in the list had been allocated to, the remaining volume is allocated in time priority to the matching list.
8. If there is still volume left to trade on the incoming order, repeat the entire algorithm at the next price level.

In the Split Price Time Pro-Rata algorithms, a Price Time Percentage parameter is defined. This percentage of the matching volume at each price is allocated by the Price Explicit Time algorithm and the remainder is allocated by the Threshold Pro-Rata algorithm. There are four variants of this algorithm, with and without Priority and/or Preference. The Price Time Percentage parameter is an integer between 1 and 99. (A percentage of zero would be equivalent to using the respective existing Threshold Pro-Rata algorithm, and a percentage of 100 would be equivalent to using the respective existing Price Time algorithm). The Price Time Volume will be the residual incoming volume, after any priority and/or Preference allocation has been made, multiplied by the Price Time Percentage. Fractional parts will be rounded up, so the Price Time Volume will always be at least 1 lot and may be the entire incoming volume. The Price Time Volume is allocated to resting orders in strict time priority. Any remaining incoming volume after the Price Time Volume has been allocated will be allocated according to the respective Threshold Pro-Rata algorithm. The sequence of allocation, at each price level, is therefore:

1. Priority order, if applicable
2. Preference allocation, if applicable
3. Price Time allocation of the configured percentage of incoming volume
4. Threshold Pro-Rata allocation of any remaining incoming volume
5. Final allocation of any leftover lots in time sequence.

Any resting order may receive multiple allocations from the various stages of the algorithm.

It will be appreciated that there may be other allocation algorithms, including combinations of algorithms, now available or later developed, which may be utilized with the disclosed implementations, and all such algorithms are contemplated herein. In one implementation, the disclosed implementations may be used in any combination or sequence with the allocation algorithms described herein.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described above, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

As described above, matching systems apply a single algorithm, or combined algorithm, to all of the orders received for a particular financial product to dictate how the entire quantity of the incoming order is to be matched/allocated. In contrast, the disclosed implementations may apply different matching algorithms, singular or combined, to different orders, as will be described, recognizing that the allocation algorithms used by the trading host for a particular market may, for example, affect the liquidity of the market. Specifically, some allocation algorithms may encourage traders to submit more orders, where each order is relatively small, while other allocation algorithms encourage traders to submit larger orders. Other allocation algorithms may encourage a trader to use an electronic trading system that can monitor market activity and submit orders on behalf of the trader very quickly and without intervention. As markets and technologies available to traders evolve, the allocation algorithms used by trading hosts must also evolve accordingly to enhance liquidity and price discovery in markets, while maintaining a fair and equitable market.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

$$\text{Butterfly} = \text{Leg1} - 2 \times \text{Leg2} + \text{Leg3} \quad \text{(equation 1)}$$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Thus an exchange may match outright orders, such as individual contracts or spread orders (which as discussed above could include multiple individual contracts). The exchange may also imply orders from outright orders. For example, exchange computer system 100 may derive, identify and/or advertise, publish, display or otherwise make available for trading orders based on outright orders.

For example, two different outright orders may be resting on the books, or be available to trade or match. The orders may be resting because there are no outright orders that match the resting orders. Thus, each of the orders may wait or rest on the books until an appropriate outright counter-offer comes into the exchange or is placed by a user of the exchange. The orders may be for two different contracts that only differ in delivery dates. It should be appreciated that such orders could be represented as a calendar spread order. Instead of waiting for two appropriate outright orders to be placed that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the match engine is configured to detect that the two resting orders may be combined into an order in the spread instrument and accordingly creates an implied order.

In other words, the exchange's matching system may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying legs. Implied IN or implied OUT spread may be created when an electronic match system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some existing exchanges attempt to match orders for spread products with multiple orders for legs of the spread products. With such systems, every spread product contract is broken down into a collection of legs and an attempt is made to match orders for the legs. Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 142.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets" ("the '962 Publication"), the entire disclosure of which is incorporated by reference herein and relied upon. Settlement price determination techniques may be implemented to cover calendar month spread instruments having different deferred month contracts.

The disclosed implementations may be implemented in a data transaction processing system that processes data items or objects. Customer or user devices (e.g., computers) may submit electronic data transaction request messages to the data transaction processing system over a data communication network. The electronic data transaction request messages may include, for example, transaction matching parameters, such as instructions and/or values, for processing the data transaction request messages within the data transaction processing system. The instructions may be to buy or sell a quantity of a product at a given value. The instructions may also be conditional, e.g., buy or sell a quantity of a product at a given value if a trade for the product is executed at some other reference value. The data transaction processing system may include a specifically configured matching processor that matches, e.g., automatically, electronic data transaction request messages for the same one of the data items. The specifically configured matching processor may match electronic data transaction request messages based on multiple transaction matching parameters from the different client computers.

The various implementations may automatically perform a corrective action, e.g., halt or release the matching processor depending on the state of the system and/or the contents of the electronic data transaction request messages. For example, upon detecting an undesirable condition within the data transaction processing system, the velocity logic, as discussed above, may cause halting of the matching processor, which prevents the matching processor from matching messages, e.g., places the system or data objects related to the undesirable condition in a request halt or other reserved state. After the passage of time, receipt of a number of messages, or some other predetermined condition, the velocity detection and mitigation system may release the matching processor, or allow the matching processor to resume matching messages.

The various implementations effectively periodically sample, derive or otherwise measure a parameter indicative of the market value of a product, such as a futures contract, which may be represented as a data object within a data transaction processing system. The market for the product may also be referred to as an order book, which may be stored as a data structure within the memory of the data transaction processing system. Parameters indicative of the market value include the most recent price at which a trade was matched or quantity associated therewith, the most recently received, i.e. via an incoming order, bid price or quantity associated therewith, the most recently received, i.e. via an incoming order, ask price or quantity associated therewith, the current lowest ask price for an unmatched trade order resting in the order book or quantity associated therewith, the current highest bid price for an unmatched trade order resting in the order book or quantity associated therewith, combinations thereof or derivations therefrom, such as volatility, average, difference from historical values or other parameter, statistical or otherwise, indicative of the conditions under which the market is operating. When monitoring price based parameters, the values associated therewith may be measured in ticks, points or other metric. Time may be measured, as an overall elapse of time from an origin and/or between defined events, in second or milliseconds, or other increment. When sampling, deriving or otherwise measuring a parameter that is derived from an incoming trade order, such as the order price, every trade may be sampled or otherwise analyzed for comparison as will be described.

Figure 3:
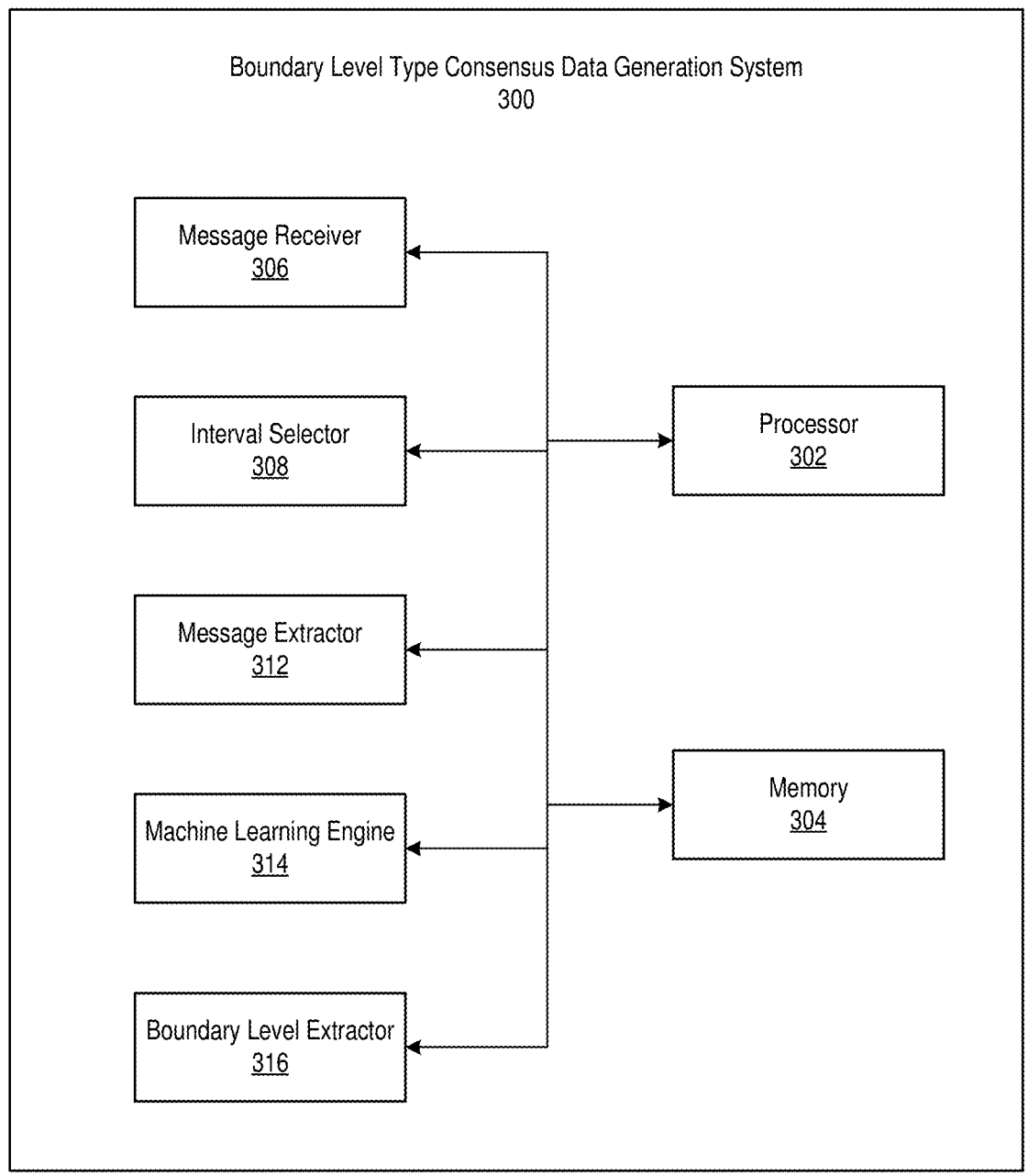
FIG. 3 shows an example system for generation of boundary level type consensus data for use with various implementations.

FIG. 3 shows an example system 300 for generation of boundary level type consensus data. In various implementations the system 300 may implement boundary logic 400 discussed below. The system 300 includes a processor 302 and a memory 304 coupled therewith which may be implemented as a processor 202 and memory 204 as described with respect to FIG. 2. The processor 302 using instructions stored on the memory 304 may implement a message receiver 306, an interval selector 308, message extractor 312, a machine learning engine 314, and a boundary level extractor 316, to perform various functions of the boundary logic 400.

In various implementations, the example system may be used in an electronic trading system to determine imputed variability (e.g., to determine implied volatility) for a market for one or more financial products. For example, the system 300 may be integrated into various modules of the system 100. For example, the system 300 may be implemented by any of or collectively by a message management module 140, a risk management module 134, and/or an order processing module 136 of an exchange computing system 100.

In various implementations, the system 300 may be coupled to the order book module 110 and/or various market data feeds to have access to current parameters with which to determine data from request and counter request electronic data messages.

In various implementations, the message receiver 306 may receive, e.g., over an electronic communications network, multiple electronic data messages within a specific time interval defined by the interval selector 308. The electronic data messages may include request electronic data messages and/or counter-request electronic data messages.

The specific time interval may include a defined time interval over which participant messages are being characterized. For example, the interval may include a continuous time interval from the immediate past. For example, the last 5 minutes, the last 20 minutes, the period from an event (such as a market open or other event) to the present, or other time interval from the immediate past. In some cases, the time interval may be selected from intervals other than those from the immediate past. For example, an interval from a previous day (e.g., a day other than the current day), previous week, or previous year may be used. In some cases, the specific time interval may be non-contiguous. For example, a period including a time before an event from a previous day and time after an event on the current day may be used. In an illustrative example, a time interval may include the last 30 minutes before a market close on a previous day along the time from a market open on the current day. Other discontinuous time intervals may be used. Virtually any time interval defined such that it can be determined whether a particular electronic data message lands inside or outside of the interval may be used.

In some cases, the interval selector 308 may evaluate data from the defined interval for using various data quality metrics. For example, the distribution of data versus execution value, the quantity of electronic data messages, the time distribution of receipt time of messages within the window, status indications (such as up time or down time indicators) from the processor 302. In some cases when the interval selector 308 determines that a quality indicator has fallen below a pre-determined quality threshold, the interval selector 308 may add data for analysis. For example, the interval selector 308 may extend the interval to continue past an end time. For example, interval selector 308 may define the interval to include an earlier time period before the previous start of the interval. For example, the interval selector 308 may defined the interval to include a period between two non-contiguous periods of the interval as previously defined. For example, the interval selector 308 may add a set of messages from outside the interval without re-defining the bounds of the interval.

The message extractor 312 may extract data from the electronic data messages. For example, the message extractor 312 may extract a request value or counter-request value that indicates the value assigned to the operations requested or counter-requested. The message extractor may determine an execution value at which the operations requested or counter-requested would be performed. In an illustrative example context for financial products trading, the request value or counter-request values may correspond to bid or ask prices for options contracts. In the example context, the execution value may correspond to a strike price for the options contract.

The message extractor 312 may determine an imputed variability associated with the extracted execution value, request/counter-request value, and one or more current conditions using a variability model. Which may include one or more algorithms for determination of an imputed variability based on one or more input values. In an illustrative example scenario for financial products markets, the message extractor 312 may determine an implied volatility using one or more implied volatility models, such as a Black Scholes implied volatility model, a Whaley implied volatility model, or other implied volatility models. In some cases, the variability model may depend on an underlying nature of the operation to be performed. For example, for financial products markets examples, the model for determination of implied volatility may depend on the nature of the underlying financial product for which the transaction was requested.

The message extractor 312 may compile the extracted data into input codes. The input codes may include one or more indicators that indicate extracted values (e.g., request/counter-request values, execution values, imputed variability levels, or other values), message types (e.g., request type, counter-request type, or other message type), reception times, or other extracted data. The input codes may include various formats. For example, a bit vector format may be used for the input codes.

Additionally or alternatively, formats other than input codes may be generated by the message extractor 312. For example, to support the artificial neural network based image transformation technical arrangement, the message extractor 312 may extract the message data, plot the message data, and then transform the plot into image data to support image conversion at the machine learning engine 314.

The machine learning engine 314 may receive the input codes and use the input codes to generate a support vector machine specific to the time interval defined by the interval selector 308. The machine learning engine 314 may, based on the input codes, determine a message type of each of the electronic data messages. The machine learning engine 314 may determine a plurality of linear support vectors in particular order to describe a kernel function. The kernel function may correspond to a boundary that divides the data points into the separate types.

In some cases, the input codes may omit the indication of the message type. In some cases, the message type indicate may be provided as feedback to the support vector machine after the support vector machine provide an initial classification for the electronic data message corresponding the input code. In some cases, the defined interval may be or added to until the accuracy of the initial classifications of the training electronic data messages exceeds a predetermined threshold. In some cases, an initial number of data points may be excluded from the accuracy calculation. For example, the accuracy of the support vector machine may be gauged on accuracy on data points in excess of the first (e.g., 40, 60, 100, 1000 or other statistically-selected number) data points.

In an example implementation, the machine learning engine 314 may analyze the data points by projecting the data points from the electronic data message on to various hyperplanes that allow linear separation of the data points. Within each hyperplane the data is separated. The hyperplane that allows the greatest separation between the closest two data points in the hyperplane may be selected. The line that creates the hyperplane is then transformed back into the plane of the original data. The transformed version of the line on the hyperplane forms the kernel function. The kernel function may then be used to describe the boundary by the newly generated support vector machine. Because the support vector machine is trained only using electronic data messages from the defined time interval, the newly generated support vector machine is interval specific and is independent of influence from any other time period. The machine learning engine 314 may store the time-interval-specific support vector machine.

The boundary level extractor 316 may determine boundary levels from the time-interval-specific support vector machine. The boundary levels may correspond to the values determined as the kernel function of the time-interval-specific support vector machine.

In some implementations, the boundary level extractor 316 may generate dummy data including a plurality of imputed variability level and execution value (IVEV) tuples. In some cases, for intervals with message data that has data gap regions that lack data for various ranges of execution values, the IVEV tuples may specifically include IVEV tuples with execution values within the data gap regions.

After generation of the time-interval-specific support vector machine, The boundary level extractor 316 may provide the IVEV tuples to the machine learning engine 314 for classification using the time-interval-specific support vector machine. Once the selected IVEV tuples are classified, the classified IVEV tuples may provide a mapping of boundary levels. For example, the classified IVEV tuples may be analyzed to determine where (e.g., for each execution value covered) classification from one message type changes to classification to the other message type. In other words, the classified dummy data may be reviewed to determine where the fictional 'electronic data messages' represented by the dummy data change from being classified as request electronic data messages to counter-request electronic data messages. The variability level at which this change in classification occurs corresponds to the boundary level for the corresponding execution value.

The use of a support vector machine to obtain a classification boundary is a counter-intuitive use of a support vector machine. Contrary to common usage, the system does not rely on the support vector machine for predictive classification of individual points, but rather extracts the decision boundary from the support vector machine. In other words, the system counter-intuitively generates a support vector machine to obtain a decision boundary that characterizes the set of data (e.g., the time-interval-specific set of data) used to train the support vector machine.

In some cases, the IVEV tuples may include all imputed variability levels for each execution value of interest. In some cases, the IVEV tuples may include selected imputed variability levels for each execution value of interest. For example the IVEV tuples may be selected to be between imputed variability levels for the received request and counter-request electronic data messages. In cases where a data gap region is present, the IVEV tuples may include an area that expands more the more the execution value of interest differs from execution values for which electronic data message information is available. Using a limited set of IVEV tuples may reduce processing time relative to sets that use all imputed variability levels.

In some implementations, IVEV tuples may be selected in accord with a search function, such as a binary search function, a gradient descent, or other search algorithm. In some cases, starting levels for search function may begin at imputed variability levels corresponding to a received request or counter-request electronic data message for an execution value. In some cases, starting levels for search function may begin at boundary imputed variability levels for previously determined neighboring execution values. In some cases, default initial imputed variability levels may be used. In some cases, search values may be initialized at boundary levels for previous time intervals (e.g., time intervals prior to the interval for which the support vector machine was generated). In some cases, to facilitate search function usage, dummy data may be generated iteratively. For example, a first dummy data point may be generated and then classified. A second dummy data point may be then generated based on the classification results of the first dummy data point. Iterations of dummy data generation and classification may proceed until a boundary level is found for the execution value of interest. In some cases, the search algorithm may proceed by varying the imputed variability level of the test dummy data points while keeping the execution value constant. In some cases, the search algorithm may proceed along gradients/vectors in multiple dimensions, e.g., to trace boundary level in both imputed variability level and execution value dimensions.

In some cases, the IVEV levels may be selected based on grid patterns. For example, square grids or other grid configurations may be used. In some cases, raster scans or other grid scans may be used to select the IVEV levels in the grid pattern.

In some implementations, in addition to or in lieu of using dummy data, the boundary level extractor 316 may use one or more commands to cause the machine learning engine 314 to report the support vectors that describe the kernel function. Then, the boundary level for a specific execution value may be determined by using that execution value as the argument to the kernel function. Additionally or alternatively, the machine learning engine 314 may report kernel function outputs for provided execution value inputs. The kernel function outputs may correspond to the boundary level for the provided execution value.

The determined boundary levels may be reported within real-time and/or near-real-time (e.g., within 5 minutes, within 1 minute, within 1 second, or within another window for live data reporting validity) intervals after the end of a defined interval.

The processor 302 may cause, e.g., via network-based communications, generation of terminal displays and/or report messages to indicate the boundary levels for the selected execution values of interest to various participant nodes (e.g., the population of participant nodes including those from which the electronic data messages were received, and/or other populations of participant nodes).

In an illustrative example implementation, the imputed variability boundary levels determined by the system 300 may be used as an implied volatility curve for determining synthetic bid/ask data for use in a margin call. The implied volatility curve may be determined the system 300 implementing any of the various technical arrangements discussed above for bid/ask messages in an electronic trading system. In some implementations, a synthetic bid may be determined as one tick (or other increment) below the boundary level defined by the implied volatility curve. A synthetic ask may be determined as one tick (or other increment) above the boundary level defined by the implied volatility curve. Accordingly, the current pricing may be determined for a bid/ask message that is still unmatched at the time of analysis. Because the system 300 may provide real-time or near-real-time implied volatility curve data, accurate pricing may be determined at various intervals before market close. Existing systems do not have an accurate provide real-time or near-real-time capable of providing non-stale pricing data while a market is open and subject to change over time. Existing systems provided such data after market close, because the market may often shift before such pricing information can be synthesized rendering such information invalid before synthesis of the information is completed.

Figure 4:
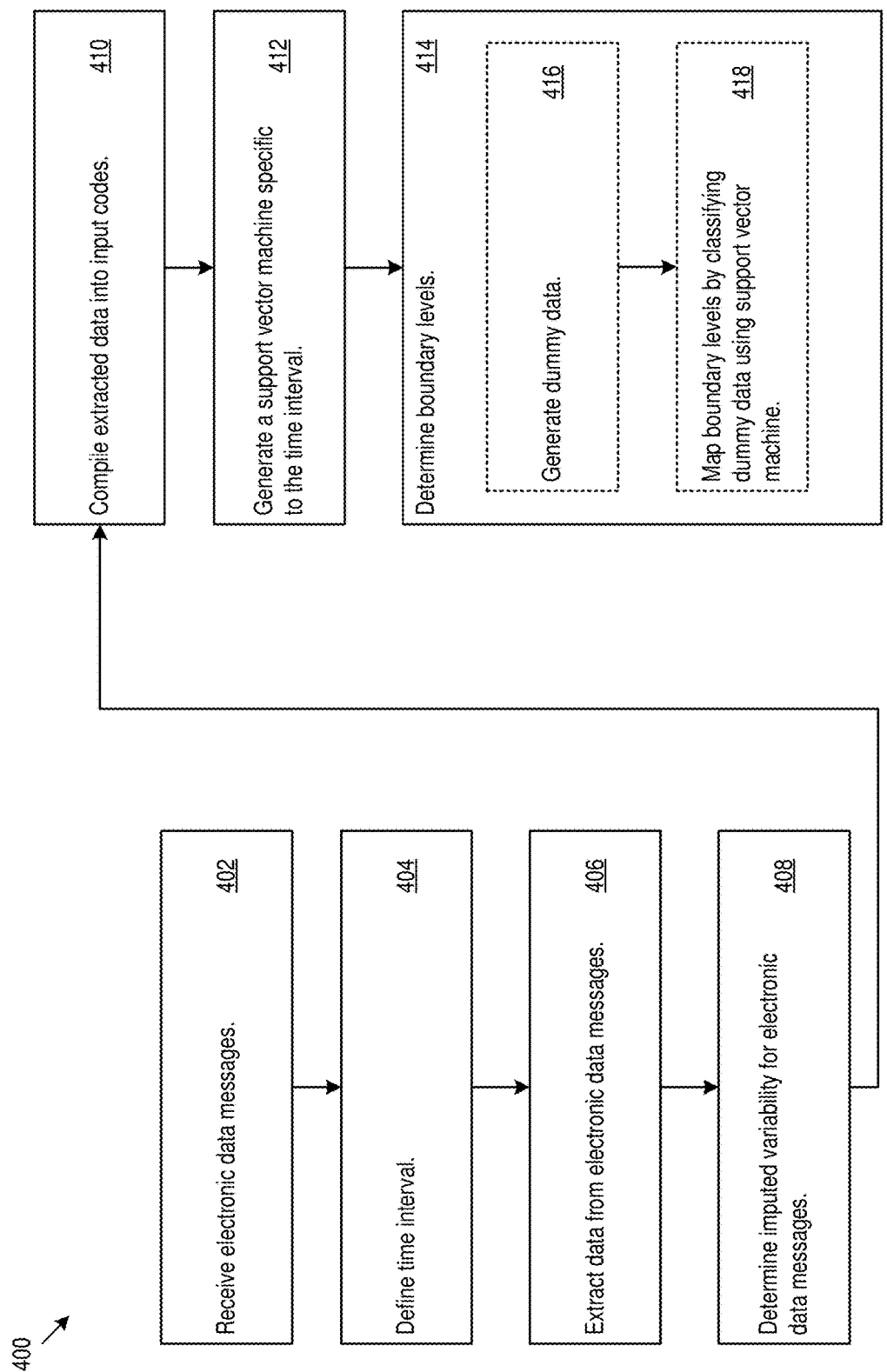
FIG. 4 shows example boundary logic for use with various implementations.

FIG. 4 shows example boundary logic 400, which may be implemented on the system 300 and/or devices and computer networks such as those described with respect to FIGS. 1 and 2. Implementations may involve all, more or fewer actions indicated by the blocks of FIG. 4. The actions may be performed in the order or sequence shown or in a different sequence. In various implementations, the functions of the boundary logic 400 may be carried out by the message management module 140, the risk management module 134, and/or various other modules of the system 100.

As shown in block 402, the boundary logic 400 may receive, e.g., over an electronic communications network and via the message receiver 306, multiple electronic data messages within a specific time interval. The electronic data messages may include request electronic data messages and/or counter-request electronic data messages. As shown in block 404, the boundary logic 400 may define the specific time interval, e.g., using the interval selector 308.

As shown in block 406, the boundary logic 400 may extract data from the electronic data messages, e.g., via operation of the message extractor 312. For example, the boundary logic 400 may extract a request value or counter-request value that indicates a value assigned to the operations requested or counter-requested. The boundary logic 400 may determine, from the extracted message data, an execution value at which the operations requested or counter-requested would be performed.

As shown in block 408, the boundary logic 400 may determine an imputed variability associated with the extracted execution value, request/counter-request value, and one or more current conditions using a variability model.

As shown in block 410, the boundary logic 400 may compile the extracted data into input codes. The input codes may include one or more indicators that indicate extracted values (e.g., request/counter-request values, execution values, imputed variability levels, or other values), message types (e.g., request type, counter-request type, or other message type), reception times, or other extracted data.

As shown in block 412, the boundary logic 400 may receive (e.g., via operation of the machine learning engine 314) the input codes and use the input codes to generate a support vector machine specific to the time interval. In some cases, the boundary logic 400 may use the message type indicators in the input codes as input to the support vector machine. In some cases, the input codes may omit indicators for the message type. When omitted from the input codes, message type indicators may be used as training feedback corrections to initial classifications by the support vector machine. Providing the message type indicators as feedback rather than initial training data may allow for monitoring of accuracy progress of the support vector machine during training As shown in block 414, the boundary logic 400 may determine (e.g., via operation of the boundary level extractor 316) boundary levels from the time-interval-specific support vector machine. The boundary levels may correspond to the values determined from the kernel function of the time-interval-specific support vector machine.

In some implementations and as shown at block 416, the boundary logic 400 may generate dummy data including a plurality of imputed variability level and execution value (IVEV) tuples. In some cases, for intervals with message data that has data gap regions that lack data for various ranges of execution values, the IVEV tuples may specifically include IVEV tuples with execution values within the data gap regions. The boundary logic 400 may generate the dummy data in accord with various ones of multiple different generation schemes, including generation for all imputed variability levels, search functions, generation based on data point positions, grid pattern generation, or other dummy data generation schemes.

After generation of the time-interval-specific support vector machine and as shown at block 418, the boundary logic 400 may provide the IVEV tuples to the machine learning engine 314 for classification using the time-interval-specific support vector machine. Once the selected IVEV tuples are classified, the classified IVEV tuples may provide a mapping of boundary levels In some implementations, in addition to or in lieu of using dummy data, the boundary logic 400 may report the support vectors that describe the kernel function. Then, the boundary levels for specific execution values may be determined by using those execution values individually as arguments to the kernel function.

Figure 5:
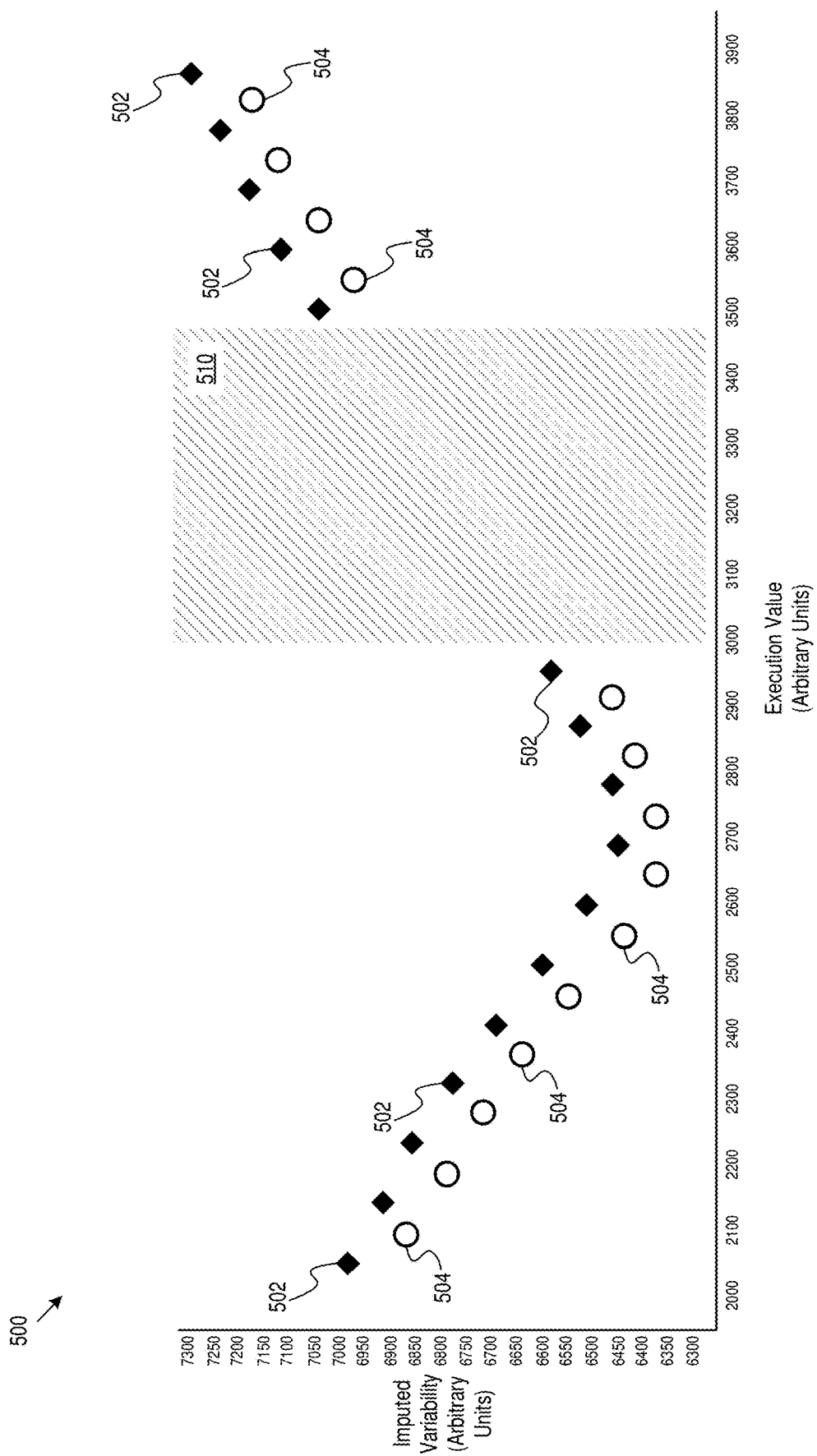
FIG. 5 shows an illustrative example plot of data points representing request electronic data messages and counter-request electronic data messages for a defined time interval.

FIG. 5 shows an illustrative example plot 500 of data points representing request electronic data messages 502 and counter-request electronic data messages 504 for a defined time interval. In the example plot a data gap region 510 is present. The data gap region 510 covers a range of execution values for which no request electronic data messages 502 and no counter-request electronic data messages 504 are present. In some cases, the presence of such data gap regions may increase difficulty determining an imputed variability boundary for the data points.

Figure 6:
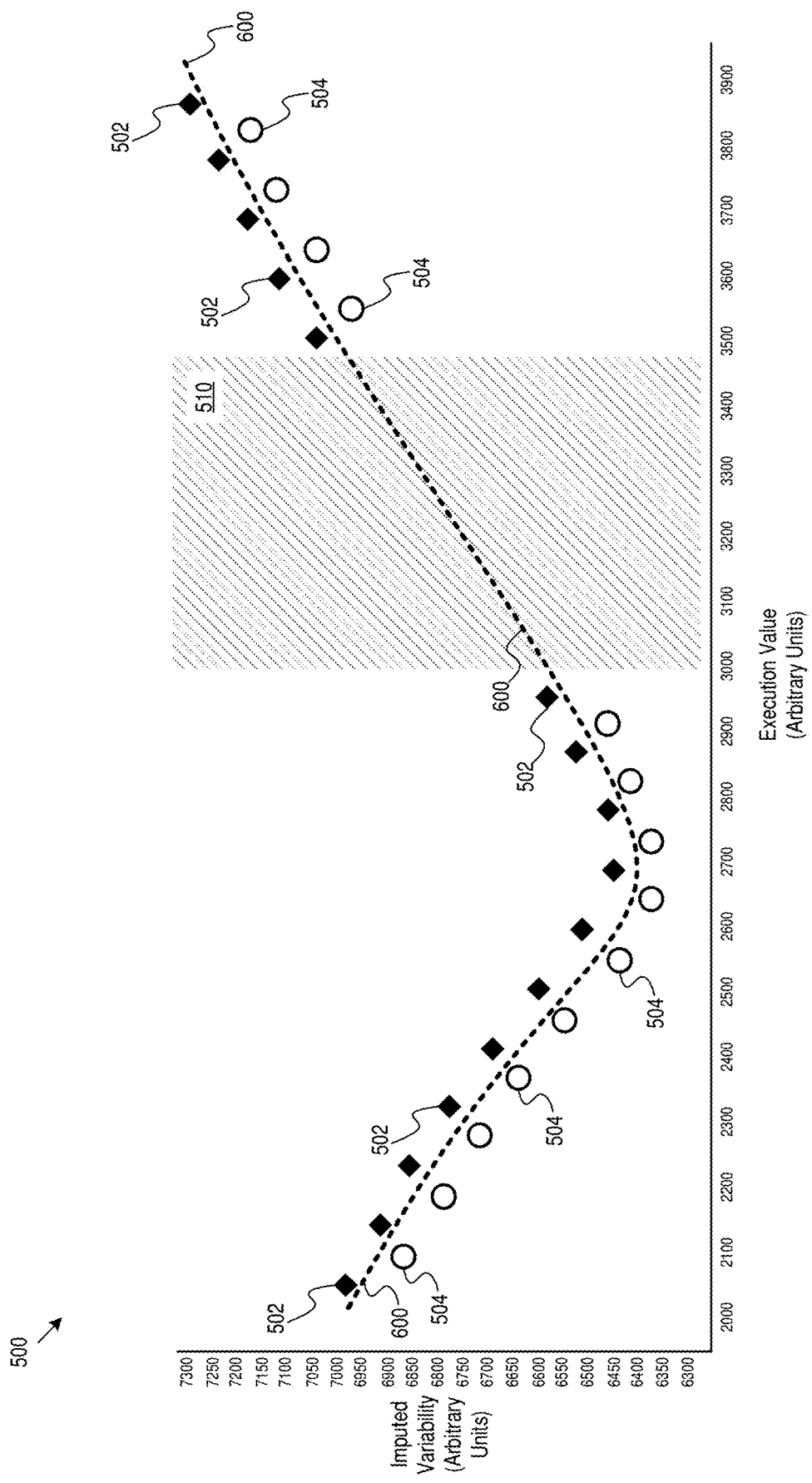
FIG. 6 shows the illustrative example plot of data points of FIG. 5 with an example imputed variability boundary.

FIG. 6 shows the illustrative example plot 500 of data points with an example imputed variability boundary 600. The example imputed variability boundary 600 may be determined using, for example, the system 300. The example imputed variability boundary 600 crosses the data gap region 510 and provides accurate imputed variability boundary level data within the data gap region 510.

Table 1 includes various examples.

TABLE 1

| Examples |
| --- |
| 1. A computer-implemented method including:<br>receiving, over an electronic communications network and from a plurality of participant network nodes, a plurality of request electronic data messages and a plurality of counter-request electronic data messages for a defined time interval;<br>for each of the plurality of request electronic data messages and the plurality of counter-request electronic data messages:<br>  determining, by a processor, a corresponding imputed variability level based on a variability model;<br>  generating, by the processor, an input code for the electronic data message the input code including:<br>    an execution value indicator for a corresponding execution value for the electronic data message, wherein the corresponding execution value includes an execution value outside a data gap range of execution values for which no corresponding request electronic data messages or counter-request electronic data messages were received within the defined time interval; and<br>    a variability indicator for the corresponding imputed variability level;<br>generating, by the processor, a time-interval-specific support vector machine for the defined time interval by applying the input codes to an initial-state support vector machine as a training input;<br>generating, by the processor, a dummy data set by generating a plurality of imputed variability level and execution value (IVEV) tuples;<br>after generating the time-interval-specific support vector machine, applying, by the processor, the dummy data set to the time-interval-specific support vector machine to obtain classified dummy data output include a request-type indicator for each of the plurality of IVEV tuples; and<br>for each of a plurality of execution values including gap execution values within the data gap range:<br>  determining, by the processor and based on the classified dummy data output, a corresponding imputed variability boundary level across which classification of request-type for the execution value, where:<br>optionally, the method is in accord with any other example in the table.<br>2. The method of any other example in the table, wherein, for each of the plurality of request electronic data messages and the plurality of counter-request electronic data messages, determining the corresponding imputed variability level based on the variability model includes determining the corresponding imputed variability level using:<br>  the corresponding execution value;<br>  a time remaining to execution;<br>  a request value; and/or<br>  a counter-request value.<br>3. The method of any other example in the table, wherein the input code further includes a request-type indicator that indicates whether the electronic data message is a request electronic data message or a counter-request electronic data message.<br>4. The method of any other example in the table, wherein generating the time-interval-specific support vector machine for the defined time interval includes providing a request-type indicator that indicates whether the electronic data message is a request electronic data message or a counter-request electronic data message as feedback after the initial-state support vector machine returns an initial response attempting to classify the electronic data message.<br>5. The method of any other example in the table, wherein the IVEV tuples are selected based on a predetermined grid pattern.<br>6. The method of any other example in the table, wherein the IVEV tuples are selected between request and counter-request imputed variability levels corresponding to the plurality of request electronic data messages and the plurality of counter-request electronic data messages.<br>7. The method of any other example in the table, wherein the IVEV tuples are selected using a search algorithm.<br>8. The method of example 7 or any other example in the table, wherein the search algorithm operates in one dimension by keeping execution value constant while varying an imputed variability level.<br>9. The method of any other example in the table, further including<br>determining that the plurality of request electronic data messages and the plurality of counter-request electronic data messages for the defined time interval fail to meet a data quality threshold; and<br>responsive to the plurality of counter-request electronic data messages for the defined time interval failing to meet the data quality threshold:<br>  obtaining a plurality of electronic data request messages from outside of the defined time interval; |

TABLE 1-continued

Examples for each of the plurality of electronic data request messages from outside of the defined time interval:
  determining a corresponding imputed variability level based on the variability model;
  generating an input code for the electronic data message the input code including:
   an execution value indicator for a corresponding execution value for the electronic data message; and
   a variability indicator for the corresponding imputed variability level.
10. The method of any other example in the table, further including causing generation of an at least near-real-time display of the corresponding imputed variability boundary level for each of the plurality of execution values.
11. The method of example 10 or any other example in the table, wherein the at least near-real-time display includes a display for which the defined time interval ended less than five minutes before generation of the display.
12. The method of any other example in the table, further including sending, to a first node of the plurality of participant network nodes, a message including a configuration parameter of the time-interval-specific support vector machine to allow local execution of an instance of the time-interval-specific support vector machine at the first node.
13. Non-transitory machine-readable media including instructions stored thereon, the instructions configured to, when executed, cause a processor to:
 receive, over an electronic communications network and from a plurality of participant network nodes, a plurality of request electronic data messages and a plurality of counter-request electronic data messages for a defined time interval;
 for each of the plurality of request electronic data messages and the plurality of counter-request electronic data messages:
  determine a corresponding imputed variability level based on a variability model;
  generate an input code for the electronic data message the input code including:
   an execution value indicator for a corresponding execution value for the electronic data message, wherein the corresponding execution value includes an execution value outside a data gap range of execution values for which no corresponding request electronic data messages or counter-request electronic data messages were received within the defined time interval; and
   a variability indicator for the corresponding imputed variability level;
 generate a time-interval-specific support vector machine for the defined time interval by applying the input codes to an initial-state support vector machine as a training input;
 generate a dummy data set by generating a plurality of imputed variability level and execution value (IVEV) tuples;
 after generating the time-interval-specific support vector machine, apply the dummy data set to the time-interval-specific support vector machine to obtain classified dummy data output include a request-type indicator for each of the plurality of IVEV tuples; and
 for each of a plurality of execution values including gap execution values within the data gap range:
  determine, based on the classified dummy data output, a corresponding imputed variability boundary level across which classification of request-type for the execution value, where:
optionally, the non-transitory machine-readable media is in accord with any other example in the table.
14. The non-transitory machine readable media of any other example in the table, wherein, for each of the plurality of request electronic data messages and the plurality of counter-request electronic data messages, the instructions are configured to cause the processor to determine the corresponding imputed variability level based on the variability model includes determining the corresponding imputed variability level using:
 the corresponding execution value;
 a time remaining to execution;
 a request value; and/or
 a counter-request value.
15. The non-transitory machine readable media of any other example in the table, wherein the input code further includes a request-type indicator that indicates whether the electronic data message is a request electronic data message or a counter-request electronic data message.
16. The non-transitory machine readable media of any other example in the table, wherein the instructions are configured to cause the processor to generate the time-interval-specific support vector machine for the defined time interval by providing a request-type indicator that indicates whether the electronic data message is a request electronic data message or a counter-request electronic data message as feedback after the initial-state support vector machine returns an initial response attempting to classify the electronic data message.
17. The non-transitory machine readable media of any other example in the table, wherein the IVEV tuples are selected based on a predetermined grid pattern.
18. The non-transitory machine readable media of any other example in the table, wherein the IVEV tuples are selected between request and counter-request imputed variability levels corresponding to the plurality of request electronic data messages and the plurality of counter-request electronic data messages.

TABLE 1-continued

Examples

19. The non-transitory machine readable media of any other example in the table, wherein the IVEV tuples are selected using a search algorithm.
20. A system including:
means for receiving, over an electronic communications network and from a plurality of participant network nodes, a plurality of request electronic data messages and a plurality of counter-request electronic data messages for a defined time interval;
for each of the plurality of request electronic data messages and the plurality of counter-request electronic data messages:
   means for determining a corresponding imputed variability level based on a variability model;
   means for generating an input code for the electronic data message the input code including:
      an execution value indicator for a corresponding execution value for the electronic data message, wherein the corresponding execution value includes an execution value outside a data gap range of execution values for which no corresponding request electronic data messages or counter-request electronic data messages were received within the defined time interval; and
      a variability indicator for the corresponding imputed variability level;
means for generating a time-interval-specific support vector machine for the defined time interval by applying the input codes to an initial-state support vector machine as a training input;
means for generating a dummy data set by generating a plurality of imputed variability level and execution value (IVEV) tuples;
means for applying, after generating the time-interval-specific support vector machine, the dummy data set to the time-interval-specific support vector machine to obtain classified dummy data output include a request-type indicator for each of the plurality of IVEV tuples; and
for each of a plurality of execution values including gap execution values within the data gap range:
   means for determining, based on the classified dummy data output, a corresponding imputed variability boundary level across which classification of request-type for the execution value, where:
optionally, the system is in accord with any other example in the table.
21. A computer-implemented method including:
receiving, over an electronic communications network and from a plurality of participant network nodes, a plurality of request electronic data messages and a plurality of counter-request electronic data messages for a defined time interval;
for each of the plurality of request electronic data messages and the plurality of counter-request electronic data messages:
   determining, by a processor, a corresponding imputed variability level based on a variability model;
   generating, by the processor, an input code for the electronic data message the input code including:
      an execution value indicator for a corresponding execution value for the electronic data message; and
      a variability indicator for the corresponding imputed variability level;
generating, by the processor, a time-interval-specific support vector machine for the defined time interval by applying the input codes to an initial-state support vector machine as a training input;
generating, by the processor, a dummy data set by generating a plurality of imputed variability level and execution value (IVEV) tuples;
after generating the time-interval-specific support vector machine, applying, by the processor, the dummy data set to the time-interval-specific support vector machine to obtain classified dummy data output include a request-type indicator for each of the plurality of IVEV tuples; and
for each of a plurality of execution values:
   determining, by the processor and based on the classified dummy data output, a corresponding imputed variability boundary level across which classification of request-type for the execution value, where:
optionally, the method is in accord with any other example in the table.
22. A system including a processor configured to perform the method of any other example in the table.
23. A product including:
a machine-readable medium; and
instructions stored on the machine-readable medium, the instructions configured to cause a processor to perform the method of any other example in the table, where:
   optionally, the instructions are executable;
   optionally, the machine-readable medium is non-transitory
   optionally, the machine-readable medium is other than a transitory signal.

The illustrations of the implementations described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features of particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

One or more implementations of the disclosure may be referred to herein, individually and/or collectively, by the term "invention" merely for convenience and without intending to voluntarily limit the scope of this application to any particular invention or inventive concept. Moreover, although specific implementations have been illustrated and described herein, it should be appreciated that any subsequent arrangement designed to achieve the same or similar purpose may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single implementation for the purpose of streamlining the disclosure. This disclosure is not to be interpreted as reflecting an intention that the claimed implementations require more features than are expressly recited in each claim. Rather, as the following claims reflect, inventive subject matter may be directed to less than all of the features of any of the disclosed implementations. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method comprising:
   receiving, over an electronic communications network and from a plurality of participant network nodes, a plurality of request electronic data messages and a plurality of counter-request electronic data messages for a defined time interval;
   for each of the plurality of request electronic data messages and the plurality of counter-request electronic data messages:
      determining, by a processor, a corresponding imputed variability level;
      generating, by the processor, an input code for the electronic data message the input code based on:
         a corresponding execution value for the electronic data message, wherein the corresponding execution value includes an execution value outside a data gap range of execution values for which no corresponding request electronic data messages or counter-request electronic data messages were received within the defined time interval; and
         the corresponding imputed variability level;
   generating, by the processor, a time-interval-specific support vector machine for the defined time interval by applying the input codes to an initial-state support vector machine as a training input;
   generating, by the processor, a dummy data set by generating a plurality of imputed variability level and execution value (IVEV) tuples;
   after generating the time-interval-specific support vector machine, applying, by the processor, the dummy data set to the time-interval-specific support vector machine to obtain classified dummy data output for each of the plurality of IVEV tuples; and
   for each of a plurality of execution values including gap execution values within the data gap range:
      determining, by the processor and based on the classified dummy data output, a corresponding imputed variability boundary level across which classification of request-type for the execution value.

2. The computer-implemented method of claim 1, wherein, for each of the plurality of request electronic data messages and the plurality of counter-request electronic data messages, determining the corresponding imputed variability level includes determining the corresponding imputed variability level using:
   the corresponding execution value;
   a time remaining to execution;
   a request value; and/or
   a counter-request value.

3. The computer-implemented method of claim 1, wherein the input code further indicates whether the electronic data message is a request electronic data message or a counter-request electronic data message.

4. The computer-implemented method of claim 1, wherein generating the time-interval-specific support vector machine for the defined time interval indicates whether the electronic data message is a request electronic data message or a counter-request electronic data message as feedback after the initial-state support vector machine returns an initial response attempting to classify the electronic data message.

5. The computer-implemented method of claim 1, wherein the IVEV tuples are selected based on a predetermined grid pattern.

6. The computer-implemented method of claim 1, wherein the IVEV tuples are selected between request and counter-request imputed variability levels corresponding to the plurality of request electronic data messages and the plurality of counter-request electronic data messages.

7. The computer-implemented method of claim 1, wherein the IVEV tuples are selected using a search algorithm.

8. The computer-implemented method of claim 7, wherein the search algorithm operates in one dimension by keeping execution value constant while varying an imputed variability level.

9. The computer-implemented method of claim 1, further including
  determining that the plurality of request electronic data messages and the plurality of counter-request electronic data messages for the defined time interval fail to meet a data quality threshold; and
  responsive to the plurality of counter-request electronic data messages for the defined time interval failing to meet the data quality threshold:
    obtaining a plurality of electronic data request messages from outside of the defined time interval;
    for each of the plurality of electronic data request messages from outside of the defined time interval:
      determining a corresponding imputed variability level based;
      generating an input code for the electronic data message the input code based on:
        a corresponding execution value for the electronic data message; and
        the corresponding imputed variability level.

10. The computer-implemented method of claim 1, further including causing generation of an at least near-real-time display of the corresponding imputed variability boundary level for each of the plurality of execution values.

11. The computer-implemented method of claim 10, wherein at least near-real-time display includes a display for which the defined time interval ended less than five minutes before generation of the display.

12. The computer-implemented method of claim 1, further including sending, to a first node of the plurality of participant network nodes, a message including a configuration parameter of the time-interval-specific support vector machine to allow local execution of an instance of the time-interval-specific support vector machine at the first node.

13. Non-transitory machine-readable media including instructions stored thereon, the instructions configured to, when executed, cause a processor to:
  receive, over an electronic communications network and from a plurality of participant network nodes, a plurality of request electronic data messages and a plurality of counter-request electronic data messages for a defined time interval;
  for each of the plurality of request electronic data messages and the plurality of counter-request electronic data messages:
    determine a corresponding imputed variability level;
    generate an input code for the electronic data message the input code based on:
      a corresponding execution value for the electronic data message, wherein the corresponding execution value includes an execution value outside a data gap range of execution values for which no corresponding request electronic data messages or counter-request electronic data messages were received within the defined time interval; and
      the corresponding imputed variability level;
  generate a time-interval-specific support vector machine for the defined time interval by applying the input codes to an initial-state support vector machine as a training input;
  generate a dummy data set by generating a plurality of imputed variability level and execution value (IVEV) tuples;
  after generating the time-interval-specific support vector machine, apply the dummy data set to the time-interval-specific support vector machine to obtain classified dummy data output that indicates a request-type for each of the plurality of IVEV tuples; and
  for each of a plurality of execution values including gap execution values within the data gap range:
    determine, based on the classified dummy data output, a corresponding imputed variability boundary level across which classification of request-type for the execution value.

14. The non-transitory machine readable media of claim 13, wherein, for each of the plurality of request electronic data messages and the plurality of counter-request electronic data messages, the instructions are configured to cause the processor to determine the corresponding imputed variability level based on the variability model includes determining the corresponding imputed variability level using:
  the corresponding execution value;
  a time remaining to execution;
  a request value; and/or
  a counter-request value.

15. The non-transitory machine readable media of claim 13, wherein the input code further includes a request-type indicator that indicates whether the electronic data message is a request electronic data message or a counter-request electronic data message.

16. The non-transitory machine readable media of claim 13, wherein the instructions are configured to cause the processor to generate the time-interval-specific support vector machine for the defined time interval by providing a request-type indicator that indicates whether the electronic data message is a request electronic data message or a counter-request electronic data message as feedback after the initial-state support vector machine returns an initial response attempting to classify the electronic data message.

17. The non-transitory machine readable media of claim 13, wherein the IVEV tuples are selected based on a predetermined grid pattern.

18. The non-transitory machine readable media of claim 13, wherein the IVEV tuples are selected between request and counter-request imputed variability levels corresponding to the plurality of request electronic data messages and the plurality of counter-request electronic data messages.

19. The non-transitory machine readable media of claim 13, wherein the IVEV tuples are selected using a search algorithm.

20. A system including:
  means for receiving, over an electronic communications network and from a plurality of participant network nodes, a plurality of request electronic data messages and a plurality of counter-request electronic data messages for a defined time interval;

for each of the plurality of request electronic data messages and the plurality of counter-request electronic data messages:
  means for determining a corresponding imputed variability level;
  means for generating an input code for the electronic data message the input code based on:
    a corresponding execution value for the electronic data message, wherein the corresponding execution value includes an execution value outside a data gap range of execution values for which no corresponding request electronic data messages or counter-request electronic data messages were received within the defined time interval; and
    the corresponding imputed variability level;
means for generating a time-interval-specific support vector machine for the defined time interval by applying the input codes to an initial-state support vector machine as a training input;
means for generating a dummy data set by generating a plurality of imputed variability level and execution value (IVEV) tuples;
means for applying, after generating the time-interval-specific support vector machine, the dummy data set to the time-interval-specific support vector machine to obtain classified dummy data output that indicates a request-type for each of the plurality of IVEV tuples; and
for each of a plurality of execution values including gap execution values within the data gap range:
  means for determining, based on the classified dummy data output, a corresponding imputed variability boundary level across which classification of request-type for the execution value.

\* \* \* \* \*